US012705923B2

(12) United States Patent
Song et al.

(10) Patent No.: US 12,705,923 B2
(45) Date of Patent: Aug. 11, 2026

(54) FINGERPRINT SENSOR AND DISPLAY DEVICE INCLUDING THE SAME

(71) Applicant: Samsung Display Co., LTD., Yongin-si (KR)

(72) Inventors: Hee Rim Song, Yongin-si (KR); Cheol Gon Lee, Yongin-si (KR); Mu Kyung Jeon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/745,083

(22) Filed: Jun. 17, 2024

(65) Prior Publication Data

US 2025/0104463 A1 Mar. 27, 2025

(30) Foreign Application Priority Data

Sep. 26, 2023 (KR) ........................ 10-2023-0129299

(51) Int. Cl.
*G06V 40/13* (2022.01)

(52) U.S. Cl.
CPC ................................ *G06V 40/1318* (2022.01)

(58) Field of Classification Search
CPC . G06V 40/1318; G06F 3/0412; G06F 3/0445; H10K 59/60; H10K 59/12; H10K 65/00; H10K 59/131; G09G 3/3233; G09G 3/3275; G09G 2300/0426; G09G 2300/0809; H10D 30/6755
See application file for complete search history.

(56) References Cited

U.S. PATENT DOCUMENTS 11,412,120 B2 8/2022 Manea et al.
12,213,357 B2 * 1/2025 Kim .................. G06V 40/1318
(Continued)

FOREIGN PATENT DOCUMENTS

CN 113869096 A 12/2021
JP 2022/062644 A 4/2022
(Continued)

OTHER PUBLICATIONS

EPO Extended European Search Report dated Feb. 7, 2025, issued in corresponding European Patent Application No. 24202607.8, 8 pages.

*Primary Examiner* — Abhishek Sarma
(74) *Attorney, Agent, or Firm* — Womble Bond Dickinson (US) LLP

(57) ABSTRACT

A fingerprint sensor includes: a gate line on a substrate and configured to supply a gate signal; a reset voltage line configured to supply a reset voltage; an initialization voltage line configured to supply an initialization voltage; a read-out line on the gate line and configured to supply a sensing signal; a light receiving element on the read-out line; a first sensor transistor configured to supply a sensing current based on a voltage of a sensor node, which is a first electrode of the light receiving element; a second sensor transistor comprising a second-first sensor transistor and a second-second sensor transistor connected in series between the reset voltage line and a gate electrode of the first sensor transistor; and a third sensor transistor comprising a third-first sensor transistor and a third-second sensor transistor connected in series between the read-out line and a first electrode of the first sensor transistor.

20 Claims, 18 Drawing Sheets

(56) References Cited

U.S. PATENT DOCUMENTS

| | | | | |
|---|---|---|---|---|
| 2020/0161493 | A1* | 5/2020 | Lee | H10D 86/481 |
| 2021/0158751 | A1 | 5/2021 | Cha et al. | |
| 2023/0116805 | A1 | 4/2023 | Kim et al. | |

FOREIGN PATENT DOCUMENTS

| | | | |
|---|---|---|---|
| KR | 10-2020-0010697 | A | 1/2020 |
| KR | 10-2021-0158592 | A | 12/2021 |
| KR | 10-2022-0030416 | A | 3/2022 |
| KR | 10-2023-0046388 | A | 4/2023 |

* cited by examiner

ST3 : ST3-1, ST3-2
ST4 : ST4-1, ST4-2

VIL1 : VIL1a, VIL1b
VIL2 : VIL2a, VIL2b

ACTL : SE2, ACT2, DE2, SE1, ACT1, DE1
GTL1 : GE2, GE1, CPE1
GTL2 : CPE2
SDL1 : DNE1, VDDL, CE1, VIL1a/VIL2a
SDL2 : DNE2, HVDL
SDL3 : DL,BRS1

ACTL : PSE2-1, PACT2-1, PDE2-1, PSE2-2, PACE2-2, PDE2-2, PSE3-1, PACT3-1, PDE3-1, PSE3-2, PACE3-2, PDE3-2
GTL1 : PGE2-1, PGE2-2, PGE3-1, PGE3-2
GTL2 : CPE2
SDL1 : PCE1, PCE3, PCE4
SDL2 : VRLb, HVDL, ROE
SDL3 : BRS1, ROL

FINGERPRINT SENSOR AND DISPLAY DEVICE INCLUDING THE SAME

CROSS-REFERENCE TO RELATED APPLICATION

The present application claims priority to and the benefit of Korean Patent Application No. 10-2023-0129299, filed on Sep. 26, 2023, in the Korean Intellectual Property Office, the entire disclosure of which is incorporated herein by reference.

BACKGROUND

1. Field

Aspects of some embodiments of the present disclosure relate to a fingerprint sensor and a display device including the same.

2. Description of the Related Art

With the advance of information-oriented society, more and more demands are placed on display devices for displaying images in various ways. For example, display devices may be utilized with, or incorporated into, various electronic devices such as smartphones, digital cameras, laptop computers, navigation devices, and smart televisions. In a display device, because each of pixels of a display panel may include a light emitting element capable of emitting light by itself, an image can be displayed without a backlight unit providing light to the display panel.

The display device may include a display panel that displays images, an optical sensor that detects light, a fingerprint sensor that detects a person's fingerprint, and the like. With diversification of electronic devices employing display devices, it may be desirable for the display devices to be provided in various designs. For example, the display device may expand a display area for displaying images by removing a sensor device such as a separate optical sensor or fingerprint sensor.

The above information disclosed in this Background section is only for enhancement of understanding of the background and therefore the information discussed in this Background section does not necessarily constitute prior art.

SUMMARY

Aspects of some embodiments of the present disclosure include a fingerprint sensor and a display device including the same that can reduce process time, save process cost, and minimize or reduce a non-display area.

However, aspects of embodiments according to the present disclosure are not restricted to those set forth herein. The above and other aspects of embodiments according to the present disclosure will become more apparent to one of ordinary skill in the art to which the present disclosure pertains by referencing the detailed description of the present disclosure given below.

According to some embodiments, a fingerprint sensor includes a gate line on a substrate to supply a gate signal, a reset voltage line supplying a reset voltage, an initialization voltage line supplying an initialization voltage, a read-out line on the gate line to supply a sensing signal, a light receiving element on the read-out line, a first sensor transistor controlling a sensing current based on a voltage of a sensor node, which is a first electrode of the light receiving element, a second sensor transistor including a second-first sensor transistor and a second-second sensor transistor connected in series between the reset voltage line and a gate electrode of the first sensor transistor, and a third sensor transistor including a third-first sensor transistor and a third-second sensor transistor connected in series between the read-out line and a first electrode of the first sensor transistor.

According to some embodiments, respective semiconductor regions of the first to third sensor transistors may be in a same layer and contain low temperature polycrystalline silicon.

According to some embodiments, the second sensor transistor may supply the reset voltage to the sensor node based on a reset signal.

According to some embodiments, the third sensor transistor may electrically connect the read-out line to the first electrode of the first sensor transistor based on the gate signal.

According to some embodiments, the fingerprint sensor may further include an active layer on the substrate and including semiconductor regions of the first to third sensor transistors, a first gate layer on the active layer, a second gate layer on the first gate layer, a first source metal layer on the second gate layer, a second source metal layer on the first source metal layer, and a third source metal layer on the second source metal layer and including the read-out line.

According to some embodiments, the fingerprint sensor may further include a first sensor connection electrode in the first source metal layer and electrically connecting the gate electrode of the first sensor transistor to a second electrode of the second-second sensor transistor.

According to some embodiments, the fingerprint sensor may further include a first sensor anode connection electrode in the second source metal layer and connected to the first sensor connection electrode, and a second sensor anode connection electrode in the third source metal layer and electrically connecting the first sensor anode connection electrode to a sensor electrode of the light receiving element.

According to some embodiments, the fingerprint sensor may further include a reset signal line on the second gate layer to supply a reset signal, and a second sensor connection electrode in the first source metal layer and electrically connecting the reset signal line to a gate electrode of each of the second-first sensor transistor and the second-second sensor transistor.

According to some embodiments, the fingerprint sensor may further include a third sensor connection electrode in the first source metal layer and connected to a first electrode of the third-first sensor transistor, and a read-out electrode in the second source metal layer and electrically connecting the third sensor connection electrode to the read-out line.

According to some embodiments, the reset voltage line may include a horizontal reset voltage line in the second source metal layer and extending in a first direction, and a vertical reset voltage line in the third source metal layer and extending in parallel with the read-out line.

According to some embodiments, the fingerprint sensor may further include a fourth sensor connection electrode in the first source metal layer and electrically connecting a first electrode of the second-first sensor transistor to the horizontal reset voltage line.

According to some embodiments, a display device includes a pixel including a pixel circuit on a substrate and a light emitting element connected to the pixel circuit, a fingerprint sensor including a sensor circuit in the same layer as the pixel circuit and a light receiving element connected to the sensor circuit and in the same layer as the light emitting element, a gate line supplying a gate signal to the pixel circuit and the sensor circuit, a reset voltage line supplying a reset voltage to the sensor circuit, a first initialization voltage line supplying a first initialization voltage to the pixel circuit, a second initialization voltage line supplying a second initialization voltage to the pixel circuit and the sensor circuit, and a read-out line receiving a sensing signal from the sensor circuit. According to some embodiments, the sensor circuit includes a first sensor transistor controlling a sensing current based on a voltage of a sensor node, which is a first electrode of the light receiving element, a second sensor transistor including a second-first sensor transistor and a second-second sensor transistor connected in series between the reset voltage line and a gate electrode of the first sensor transistor, and a third sensor transistor including a third-first sensor transistor and a third-second sensor transistor connected in series between the read-out line and a first electrode of the first sensor transistor.

According to some embodiments, respective semiconductor regions of the first to third sensor transistors may be in the same layer and contain low temperature polycrystalline silicon.

According to some embodiments, the display device may further include an active layer on the substrate and including semiconductor regions of the first to third sensor transistors, a first gate layer on the active layer, a second gate layer on the first gate layer, a first source metal layer on the second gate layer, a second source metal layer on the first source metal layer, and a third source metal layer on the second source metal layer and including the read-out line.

According to some embodiments, the display device may further includes a display driver driving the pixel and the fingerprint sensor, a data line connected to the display driver, extending in a first direction, and supplying a data voltage to the pixel, a first bridge line connected to the display driver and extending in the first direction, and a second bridge line electrically connecting the first bridge line to the data line or the read-out line.

According to some embodiments, the first bridge line may be in the third source metal layer and extends in parallel with the read-out line. The second bridge line may be in the second source metal layer and extends in a second direction intersecting the first direction.

According to some embodiments, a display device includes a pixel including a pixel circuit on a substrate and a light emitting element connected to the pixel circuit, a fingerprint sensor including a sensor circuit in the same layer as the pixel circuit and a light receiving element connected to the sensor circuit and in the same layer as the light emitting element, and a read-out line supplying a sensing signal received from the sensor circuit. According to some embodiments, the pixel circuit includes a first transistor controlling a driving current flowing through the light emitting element, a second transistor supplying a data voltage to a first electrode of the first transistor, a third transistor electrically connecting a second electrode of the first transistor to a gate electrode of the first transistor, a fourth transistor discharging the gate electrode of the first transistor to a first initialization voltage, a fifth transistor supplying a driving voltage to the first electrode of the first transistor, a sixth transistor electrically connecting the second electrode of the first transistor to a first electrode of the light emitting element, a seventh transistor discharging the first electrode of the light emitting element to a second initialization voltage, and an eighth transistor supplying a bias voltage to the first electrode of the first transistor. According to some embodiments, the sensor circuit includes a first sensor transistor controlling a sensing current based on a voltage of a sensor node, which is a first electrode of the light receiving element, a second sensor transistor supplying a reset voltage to the sensor node, which is a gate electrode of the first sensor transistor, and a third sensor transistor electrically connecting the read-out line to a first electrode of the first sensor transistor. Semiconductor regions of the first to eighth transistors of the pixel circuit and semiconductor regions of the first to third sensor transistors of the sensor circuit are in the same layer and contain low temperature polycrystalline silicon.

According to some embodiments, the third transistor may include a third-first transistor and a third-second transistor connected in series between the gate electrode of the first transistor and the second electrode of the first transistor. According to some embodiments, the fourth transistor may include a fourth-first transistor and a fourth-second transistor connected in series between the gate electrode of the first transistor and a first initialization voltage line supplying the first initialization voltage.

According to some embodiments, the second sensor transistor may include a second-first sensor transistor and a second-second sensor transistor connected in series between a reset voltage line supplying the reset voltage and the sensor node. According to some embodiments, the third sensor transistor may include a third-first sensor transistor and a third-second sensor transistor connected in series between the read-out line and the first electrode of the first sensor transistor.

According to some embodiments, the display device may further includes a display driver driving the pixel and the fingerprint sensor, a data line connected to the display driver, extending in a first direction, and supplying a data voltage to the pixel, a first bridge line connected to the display driver and extending in the first direction, and a second bridge line electrically connecting the first bridge line to the data line or the read-out line.

According to some embodiments, the fingerprint sensor and the display device including the same according to embodiments may include a sensor circuit including only of sensor transistors having a silicon-based semiconductor region, thereby reducing the process time, saving the processing cost, and minimizing or reducing the non-display area.

However, aspects and characteristics of embodiments of the present disclosure are not limited to those described above and various other aspects and characteristics are incorporated herein.

BRIEF DESCRIPTION OF THE DRAWINGS

The above and other aspects and features of the present disclosure will become more apparent by describing in more detail aspects of some embodiments thereof with reference to the attached drawings, in which.

DETAILED DESCRIPTION

Figure 1:
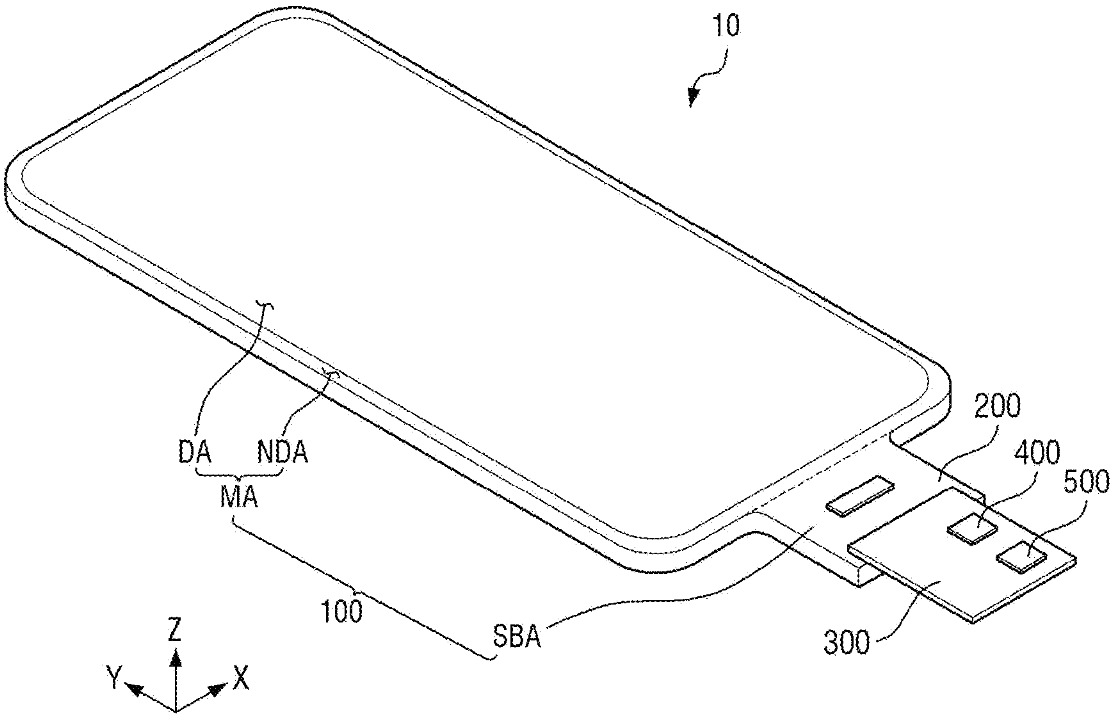
FIG. 1 is a perspective view showing a display device according to some embodiments.

In the following description, for the purposes of explanation, numerous specific details are set forth in order to provide a thorough understanding of various embodiments or implementations of the disclosure. As used herein "embodiments" and "implementations" are interchangeable words that are non-limiting examples of devices or methods employing one or more of the disclosure disclosed herein. It is apparent, however, that various embodiments may be practiced without these specific details or with one or more equivalent arrangements. In other instances, structures and devices are shown in block diagram form in order to avoid unnecessarily obscuring various embodiments. Further, various embodiments may be different, but do not have to be exclusive nor limit the disclosure. For example, specific shapes, configurations, and characteristics of an embodiment may be used or implemented in other embodiments without departing from the disclosure.

Unless otherwise specified, the illustrated embodiments are to be understood as providing features of varying detail of some ways in which the disclosure may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the disclosure.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements.

Further, the X-axis, the Y-axis, and the Z-axis are not limited to three axes of a rectangular coordinate system, and thus the X-, Y-, and Z-axes, and may be interpreted in a broader sense. For example, the X-axis, the Y-axis, and the Z-axis may be perpendicular to one another, or may represent different directions that are not perpendicular to one another.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, ZZ, or the like. As used herein, the term "and/or" includes any and all combinations of one or more of the associated listed items.

Although the terms "first," "second," and the like may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein should be interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature, and the shapes of these regions may not reflect actual shapes of regions of a device and, as such, are not necessarily intended to be limiting.

As customary in the field, some embodiments are described and illustrated in the accompanying drawings in terms of functional blocks, units, parts, and/or modules. Those skilled in the art will appreciate that these blocks, units, parts, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, parts, and/or modules being implemented by microprocessors or other similar hardware, they may be programmed and controlled using software (e.g., microcode) to perform various functions discussed herein and may optionally be driven by firmware and/or software. It is also contemplated that each block, unit, part, and/or module may be implemented by dedicated hardware, or as a combination of dedicated hardware to perform some functions and a processor (e.g., one or more programmed microprocessors and associated circuitry) to perform other functions. Also, each block, unit, part, and/or module of some embodiments may be physically separated into two or more interacting and discrete blocks, units, parts, and/or modules without departing from the scope of the disclosure. Further, the blocks, units, parts, and/or modules of some embodiments may be physically combined into more complex blocks, units, parts, and/or modules without departing from the scope of the disclosure.

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

Hereinafter, detailed embodiments of the disclosure is described with reference to the accompanying drawings.

FIG. 1 is a perspective view showing a display device according to some embodiments.

Referring to FIG. 1, a display device 10 may be applied to portable electronic devices such as a mobile phone, a smartphone, a tablet personal computer, a mobile communication terminal, an electronic organizer, an electronic book, a portable multimedia player (PMP), a navigation system, an ultra mobile PC (UMPC) or the like. For example, the display device 10 may be applied as a display unit of a television, a laptop, a monitor, a billboard, or an Internet-of-Things (IoT) device. For another example, the display device 10 may be applied to wearable devices such as a smart watch, a watch phone, a glasses type display, or a head mounted display (HMD).

The display device 10 may have a planar shape similar to a quadrilateral shape. For example, the display device 10 may have a shape similar to a quadrilateral shape, in plan view, having short sides in an X-axis direction and long sides in a Y-axis direction. The corner where the short side in the X-axis direction and the long side in the Y-axis direction meet may be rounded to have a curvature (e.g., a set or predetermined curvature) or may be right-angled. The planar shape of the display device 10 is not limited to a quadrilateral shape, and may be formed in a shape similar to another polygonal shape, a circular shape, or elliptical shape.

The display device 10 may include a display panel 100, a display driver 200, a circuit board 300, a touch driver 400, and a power supply unit 500.

The display panel 100 may include a main region MA and a sub-region SBA.

The main region MA may include the display area DA including pixels displaying an image and the non-display area NDA arranged around (e.g., in a periphery or outside a footprint of) the display area DA. The display area DA may emit light from a plurality of emission areas or a plurality of opening areas. For example, the display panel 100 may include a pixel circuit including switching elements, a pixel defining layer defining an emission area or an opening area, and a self-light emitting element.

For example, the self-light emitting element may include one of an organic light emitting diode (LED) including an organic light emitting layer, a quantum dot LED including a quantum dot light emitting layer, an inorganic LED including an inorganic semiconductor, and a micro LED, but embodiments according to the present disclosure are not limited thereto.

The non-display area NDA may be an area outside the display area DA. The non-display area NDA may be defined as an edge area of the main region MA of the display panel 100. The non-display area NDA may include a gate driver that supplies gate signals to the gate lines, and fan-out lines that connect the display driver 200 to the display area DA.

The sub-region SBA may extend from one side of the main region MA. The sub-region SBA may include a flexible material which can be bent, folded or rolled. For example, when the sub-region SBA is bent, the sub-region SBA may overlap the main region MA in a thickness direction (Z-axis direction). The sub-region SBA may include the display driver 200 and a pad portion connected to the circuit board 300. Optionally, the sub-region SBA may be omitted, and the display driver 200 and the pad portion may be arranged in the non-display area NDA.

The display driver 200 may output signals and voltages for driving the display panel 100. The display driver 200 may supply data voltages to data lines. The display driver 200 may supply a power voltage to the power line and may supply a gate control signal to the gate driver. The display driver 200 may receive a sensing signal through a read-out line. The display driver 200 may be formed as an integrated circuit (IC) and mounted on the display panel 100 by a chip on glass (COG) method, a chip on plastic (COP) method, or an ultrasonic bonding method. For example, the display driver 200 may be located in the sub-region SBA, and may overlap the main region MA in the thickness direction (Z-axis direction) by bending of the sub-region SBA. For another example, the display driver 200 may be mounted on the circuit board 300.

The circuit board 300 may be attached to the pad portion of the display panel 100 by using an anisotropic conductive film (ACF). Lead lines of the circuit board 300 may be electrically connected to the pad portion of the display panel 100. The circuit board 300 may be a flexible printed circuit board, a printed circuit board, or a flexible film such as a chip on film.

The touch driver 400 may be mounted on the circuit board 300. The touch driver 400 may be electrically connected to a touch sensing unit of the display panel 100. The touch driver 400 may supply a touch driving signal to a plurality of touch electrodes of the touch sensing unit and may sense an amount of change in capacitance between the plurality of touch electrodes. For example, the touch driving signal may be a pulse signal having a frequency (e.g., a set or predetermined frequency). The touch driver 400 may calculate whether an input is made and input coordinates based on an amount of change in capacitance between the plurality of touch electrodes. The touch driver 400 may be formed as an integrated circuit (IC).

The power supply unit 500 may be located on the circuit board 300 to supply a power voltage to the display driver 200 and the display panel 100. The power supply unit 500 may generate a driving voltage to supply it to a driving voltage line, and may generate a common voltage to supply it to a common electrode that is common to the light emitting elements of a plurality of pixels. For example, the driving voltage may be a high potential voltage for driving the light emitting element, and the common voltage may be a low potential voltage for driving the light emitting element. The power supply unit 500 may generate an initialization voltage to supply it to an initialization voltage line, generate a reference voltage to supply it to a reference voltage line, generate a bias voltage to supply it to a bias voltage line, and generate a reset voltage to supply it to a reset voltage line.

Figure 2:
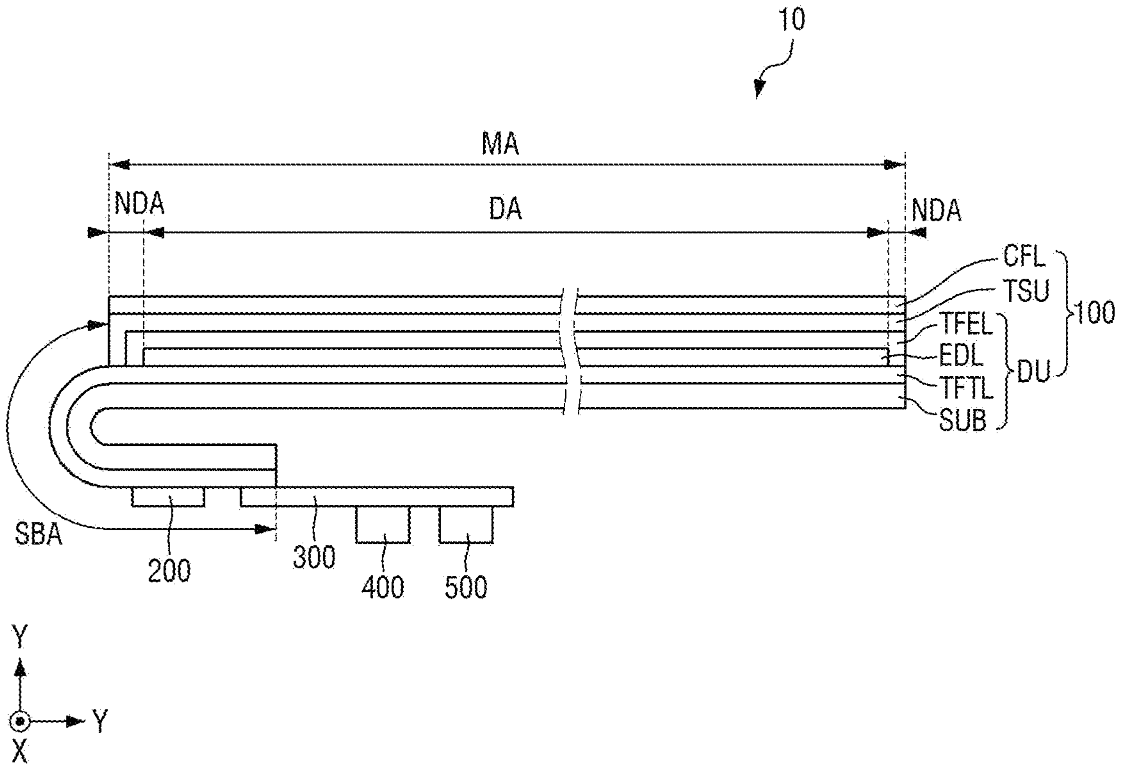
FIG. 2 is a cross-sectional view illustrating a display device according to some embodiments.

FIG. 2 is a cross-sectional view illustrating a display device according to some embodiments.

Referring to FIG. 2, the display panel 100 may include a display unit DU, a touch sensing unit TSU, and a color filter layer CFL. The display unit DU may include a substrate SUB, a transistor layer TFTL, a light emitting element layer EDL, and an encapsulation layer TFEL.

The substrate SUB may be a base substrate or a base member. The substrate SUB may be a flexible substrate which can be bent, folded or rolled. For example, the substrate SUB may include a polymer resin such as polyimide (PI), but is not limited thereto. For another example, the substrate SUB may include a glass material or a metal material.

The transistor layer TFTL may be located on the substrate SUB. The transistor layer TFTL may include a plurality of transistors constituting a pixel and a fingerprint sensor. The transistor layer TFTL may further include gate lines, data lines, power lines, read-out lines, bridge lines, and lead lines connecting the display driver 200 to the pad portion. Each of the transistors may include a semiconductor region, a source electrode, a drain electrode, and a gate electrode. For example, when the gate driver is formed on one side of the non-display area NDA of the display panel 100, the gate driver may include transistors.

The transistor layer TFTL may be located in the display area DA, the non-display area NDA, and the sub-region SBA. The transistors, gate lines, data lines, power lines, read-out lines, and bridge lines of the transistor layer TFTL may extend from the display area DA to the display driver 200. The lead lines of the transistor layer TFTL may be located in the sub-region SBA.

The light emitting element layer EDL may be located on the transistor layer TFTL. The light emitting element layer EDL may include a light emitting element of the pixel, a light receiving element of the fingerprint sensor, and a pixel defining layer that defines the pixel and the fingerprint sensor. The light emitting element may emit light by being formed of a pixel electrode, a light emitting layer, and a common electrode sequentially stacked, and the light receiving element may receive light by being formed of a sensor electrode, a light receiving layer, and a common electrode sequentially stacked. The light emitting elements and light receiving elements of the light emitting element layer EDL may be located in the display area DA.

For example, the light emitting layer may be an organic light emitting layer including an organic material. The light emitting layer may include a hole transporting layer, an organic light emitting layer, and an electron transporting layer. When the pixel electrode receives a voltage (e.g., a set or predetermined voltage) through the transistor of the transistor layer TFTL and the common electrode receives a cathode voltage, holes may move to the organic light emitting layer through the hole transporting layer, electrons may move to the organic light emitting layer through the electron transporting layer, and the holes and the electrons may combine with each other in the organic light emitting layer to emit light. For example, the pixel electrode may be an anode electrode, and the common electrode may be a cathode electrode, but embodiments according to the present disclosure are not limited thereto.

For another example, the plurality of light emitting elements may include a quantum dot light emitting diode including a quantum dot light emitting layer, an inorganic light emitting diode including an inorganic semiconductor, or a micro light emitting diode.

The light receiving element may receive light and convert light energy into an electrical signal. When a user's finger touches the display panel 100, light emitted from the light emitting element may be reflected by the finger, and the light receiving element may receive the reflected light. A sensing signal of the fingerprint sensor that receives light reflected by the ridges of the finger may be different from a sensing signal of the fingerprint sensor that receives light reflected by the valleys of the finger. The main processor may distinguish the difference between these sensing signals to generate sensing data, and based on the sensing data, may determine whether the ridges of the finger have been touched or the valleys of the finger have been touched. Accordingly, the display device 10 may recognize the pattern of the user's fingerprint based on the sensing data. For example, the light receiving element may be an organic photodiode, but embodiments according to the present disclosure are not limited thereto.

The encapsulation layer TFEL may cover the top surface and the side surface of the light emitting element layer EDL, and may protect the light emitting element layer EDL. The encapsulation layer TFEL may include at least one inorganic layer and at least one organic layer for encapsulating the light emitting element layer EDL.

The touch sensing unit TSU may be located on the encapsulation layer TFEL. The touch sensing unit TSU may include a plurality of touch electrodes for sensing a user's touch in a capacitive manner, and touch lines connecting the plurality of touch electrodes to the touch driver 400. The plurality of touch electrodes of the touch sensing unit TSU may be located in a touch sensor area overlapping the display area DA. The touch lines of the touch sensing unit TSU may be located in a touch peripheral area that overlaps the non-display area NDA. For example, the touch sensing unit TSU may sense the user's touch by using a mutual capacitance method or a self-capacitance method.

For another example, the touch sensing unit TSU may be located on a separate substrate located on the display unit DU. In this case, the substrate supporting the touch sensing unit TSU may be a base member that encapsulates the display unit DU.

The color filter layer CFL may be located on the touch sensing unit TSU. The color filter layer CFL may include a plurality of color filters respectively corresponding to the plurality of emission areas. Each of the color filters may selectively transmit light of a specific wavelength and may block or absorb light of a different wavelength. The color filter layer CFL may absorb a part of light coming from the outside of the display device 10 to reduce reflected light due to external light. Accordingly, the color filter layer CFL may prevent or reduce color distortion caused by reflection of the external light.

Because the color filter layer CFL is directly located on the touch sensing unit TSU, the display device 10 may not require a separate substrate for the color filter layer CFL. Therefore, the thickness of the display device 10 may be relatively reduced.

The sub-region SBA of the display panel 100 may extend from one side of the main region MA. The sub-region SBA may include a flexible material which can be bent, folded or rolled. For example, when the sub-region SBA is bent, the sub-region SBA may overlap the main region MA in a thickness direction (Z-axis direction). The sub-region SBA may include the display driver 200 and the pad portion electrically connected to the circuit board 300.

Figure 3:
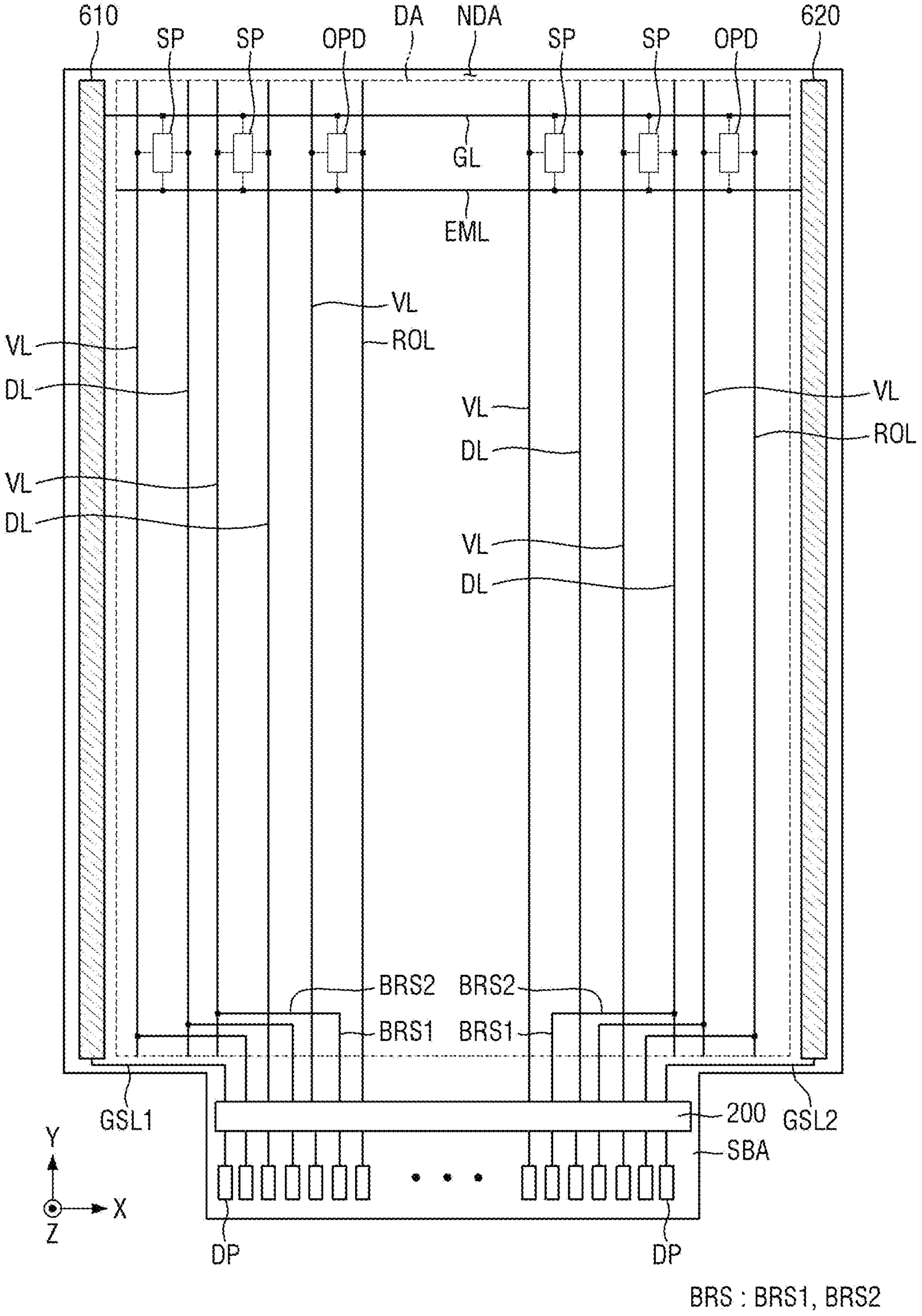
FIG. 3 is a plan view illustrating a display unit of a display device according to some embodiments.
Figure 4:
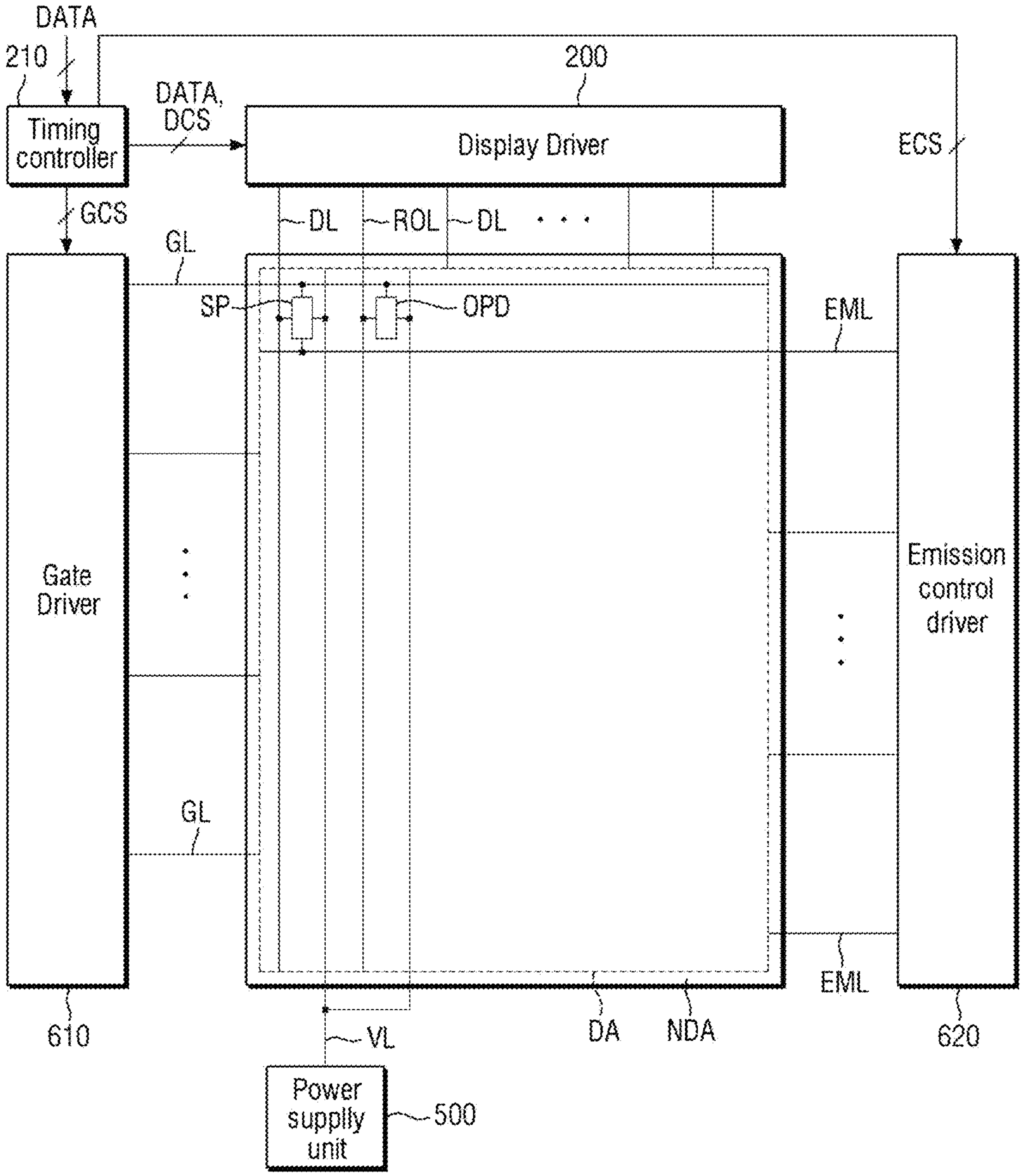
FIG. 4 is a block diagram illustrating a display panel and a display driver according to some embodiments.

FIG. 3 is a plan view illustrating a display unit of a display device according to some embodiments. FIG. 4 is a block diagram illustrating a display panel and a display driver according to some embodiments.

Referring to FIGS. 3 and 4, the display panel 100 may include the display area DA and the non-display area NDA. The display area DA may include pixels SP, fingerprint sensors OPD, power lines VL, data lines DL, read-out lines ROL, bridge lines BRS, gate lines GL, and emission control lines EML.

Each of the plurality of pixels SP may be connected to the gate line GL, the emission control line EML, the data line DL, and the power line VL. Each of the pixels SP may include at least one transistor, a light emitting element and a capacitor.

Each of the plurality of fingerprint sensors OPD may be connected to the gate line GL, the power line VL, and the read-out line ROL. Each of the plurality of fingerprint sensors OPD may include at least one transistor and the light receiving element.

The gate lines GL may extend in the X-axis direction and may be spaced apart from each other in the Y-axis direction that crosses the X-axis direction. The gate lines GL may sequentially supply gate signals to the pixels SP and the fingerprint sensors OPD.

The emission control lines EML may extend in the X-axis direction and may be spaced apart from each other in the Y-axis direction. The emission control lines EML may sequentially supply emission signals to the pixels SP.

The data lines DL may extend in the Y-axis direction and may be spaced apart from each other in the X-axis direction. Some of the data lines DL may be electrically connected to the display driver 200 through the bridge line BRS, and some others of the data lines DL may be directly connected to the display driver 200. The data lines DL may supply the data voltage to the pixels SP. The data voltage may determine the luminance of each of the pixels SP.

The power lines VL may extend in the Y-axis direction and may be spaced apart from each other in the X-axis direction. The power line VL may supply a power voltage to the pixels SP and the fingerprint sensors OPD. Some of the power lines VL may be electrically connected to the display driver 200 through the bridge line BRS, and some others of the power lines VL may be directly connected to the display driver 200. Here, the power voltage may be a driving voltage, a common voltage, an initialization voltage, a reference voltage, a bias voltage, or a reset voltage. The driving voltage may be a high potential voltage for driving the light emitting element, and the common voltage may be a low potential voltage for driving the light emitting element and the light receiving element.

The read-out lines ROL may extend in the Y-axis direction and may be spaced apart from each other in the X-axis direction. The read-out line ROL may supply a sensing signal of the fingerprint sensor OPD to the display driver 200. Some of the read-out lines ROL may be electrically connected to the display driver 200 through the bridge line BRS, and some others of the read-out lines ROL may be directly connected to the display driver 200.

The bridge line BRS may electrically connect the display driver 200 to each of the data line DL, the power line VL, and the read-out line ROL. The bridge line BRS may supply a data voltage received from the display driver 200 to some of the data lines DL. The bridge line BRS may supply a power voltage received from the display driver 200 to some of the power lines VL. The bridge line BRS may supply a sensing signal received from some of the read-out lines ROL to the display driver 200.

The bridge line BRS may include a first bridge line BRS1 and a second bridge line BRS2. The first bridge line BRS1 may extend in the Y-axis direction from the display driver 200 to the display area DA. The second bridge line BRS2 may extend from the first bridge line BRS1 in the X-axis direction or in a direction opposite to the X-axis direction and may be connected to each of the data line DL, the power line VL, and the read-out line ROL. As the display device 10 includes the bridge line BRS, the fan-out line extending from the display driver 200 to the display area DA may be omitted and the size of the non-display area NDA may be minimized or reduced.

The non-display area NDA may surround the display area DA. The non-display area NDA may include a gate driver 610, an emission control driver 620, a first gate control line GSL1, and a second gate control line GSL2.

The first gate control line GSL1 may extend from the display driver 200 to the gate driver 610. The first gate control line GSL1 may supply a gate control signal GCS received from the display driver 200 to the gate driver 610.

The second gate control line GSL2 may extend from the display driver 200 to the emission control driver 620. The second gate control line GSL2 may supply an emission control signal ECS received from the display driver 200 to the emission control driver 620.

The sub-region SBA may extend from one side of the non-display area NDA. The sub-region SBA may include the display driver 200 and the pad portion DP. The pad portion DP may be located closer to one edge of the sub-region SBA than the display driver 200. The pad portion DP may be electrically connected to the circuit board 300 through an anisotropic conductive film ACF.

The display driver 200 may include a timing controller 210 and a data driver 220.

The timing controller 210 may receive digital video data DATA and timing signals from the circuit board 300. The timing controller 210 may generate, based on the timing signals, a data control signal DCS to control the operation timing of the data driver 220, the gate control signal GCS to control the operation timing of the gate driver 610, and the emission control signal ECS to control the operation timing of the emission control driver 620. The timing controller 210 may supply the gate control signal GCS to the gate driver 610 through the first gate control line GSL1. The timing controller 210 may supply the emission control signal ECS to the emission control driver 620 through the second gate control line GSL2. The timing controller 210 may supply the digital video data DATA and the data control signal DCS to the data driver 220.

The data driver 220 may convert the digital video data DATA into analog data voltages and output them to the data lines DL. The gate signals of the gate driver 610 may select pixels SP to which the data voltage is supplied, and the selected pixels SP may receive the data voltage through the data lines DL. The data driver 220 may supply a sensing signal received through the read-out line ROL to the main processor.

The power supply unit 500 may be located on the circuit board 300 to supply a power voltage to the display driver 200 and the display panel 100. The power supply unit 500 may generate a power voltage to supply it to the power line VL, and generate a common voltage to supply it to the common electrode that is common to the pixels SP and the fingerprint sensors OPD. The power supply unit 500 may generate an initialization voltage to supply it to an initialization voltage line, generate a reference voltage to supply it to a reference voltage line, generate a bias voltage to supply it to a bias voltage line, and generate a reset voltage to supply it to a reset voltage line.

The gate driver 610 may be located at one external side of the display area DA or at one side of the non-display area NDA. The emission control driver 620 may be located at the other external side of the display area DA or at the other side of the non-display area NDA. However, embodiments according to the present disclosure are not limited thereto. As another example, the gate driver 610 and the emission control driver 620 may be located at any one of one side and the other side of the non-display area NDA.

The gate driver 610 may include a plurality of transistors for generating gate signals based on the gate control signal GCS. The emission control driver 620 may include a plurality of transistors for generating emission signals based on the emission control signal ECS. For example, the transistors of the gate driver 610 and the transistors of the emission control driver 620 may be formed in the same layer as the transistors of each pixel SP. The gate driver 610 may supply the gate signals to the gate lines GL, and the emission control driver 620 may supply the emission signals to the emission control lines EML.

Figure 5:
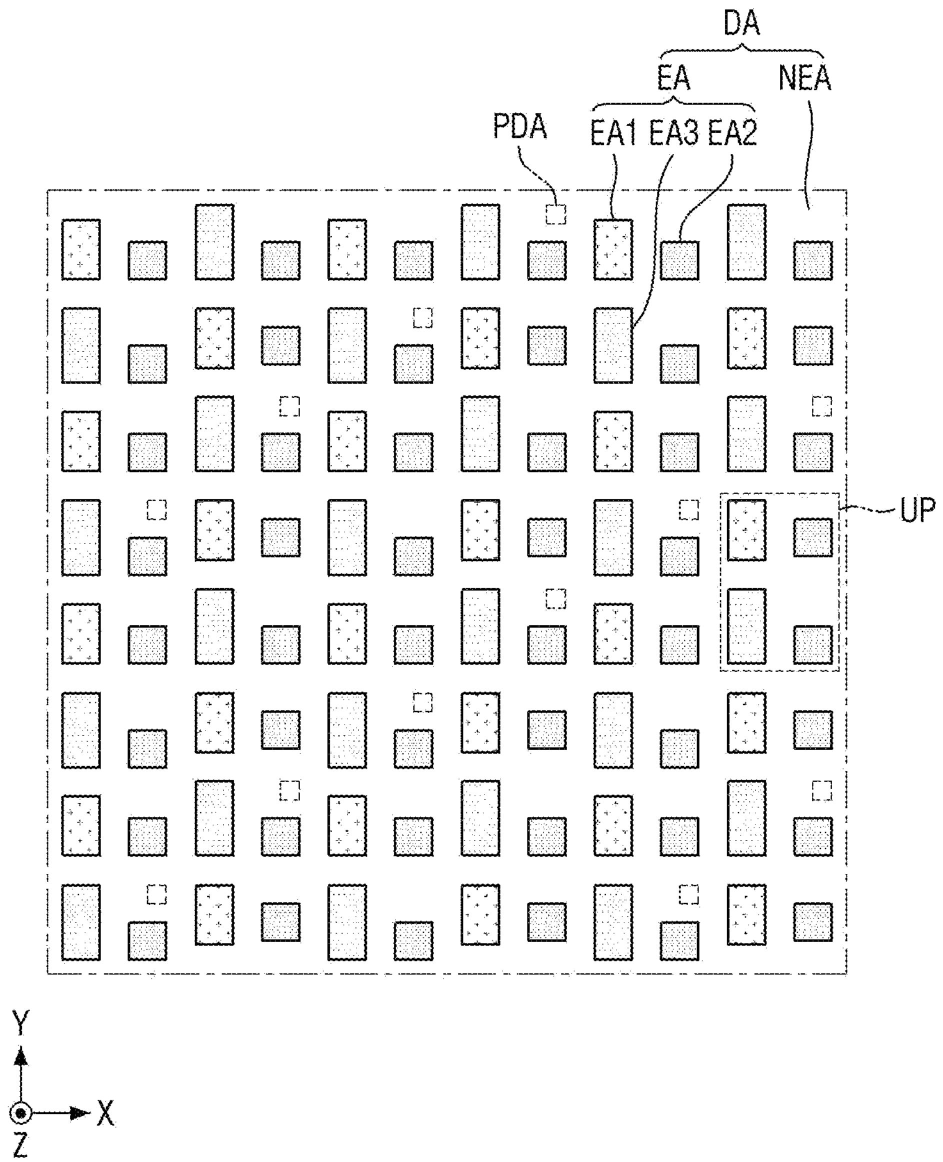
FIG. 5 is a plan view illustrating an emission area and a sensor area in a display device according to some embodiments.

FIG. 5 is a plan view illustrating an emission area and a sensor area in a display device according to some embodiments.

Referring to FIG. 5, the display area DA may include emission areas EA and a non-emission area NEA. The emission areas EA may emit light of the light emitting elements, and the light emitting elements may not be located in the non-emission area NEA. The non-emission area NEA may include sensor areas PDA spaced apart from each other with at least one emission area EA therebetween. The emission areas EA may include first to third emission areas EA1, EA2, and EA3. For example, the first emission area EA1 may emit light of a first color or red light, the second emission area EA2 may emit light of a second color or green light, and the third emission area EA3 may emit light of a third color or blue light, but is not limited thereto.

One unit pixel UP may represent white gray scale by including one first emission area EA1, two second emission areas EA2, and one third emission area EA3, but the configuration of the unit pixel UP is not limited thereto. The white gray scale may be represented by a combination of light emitted from one first emission area EA1, light emitted from two second emission areas EA2, and light emitted from one third emission area EA3.

The first to third emission areas EA1, EA2, and EA3 may be different in size from each other. For example, the size of the third emission area EA3 may be larger than that of the first emission area EA1, and the size of the first emission area EA1 may be larger than that of the second emission area EA2. However, embodiments according to the present disclosure are not limited thereto. As another example, the sizes of the first to third emission areas EA1, EA2, and EA3 may be the same.

The sensor area PDA may be surrounded by the first to third emission areas EA1, EA2, and EA3. The sensor area PDA may be adjacent to the first or third emission area EA1 or EA3 in the X-axis direction, and may be adjacent to the second emission area EA2 in the Y-axis direction. The sensor areas PDA may be spaced apart from each other with at least one emission area EA therebetween. The sensor area PDA may receive light reflected by the finger.

Figure 6:
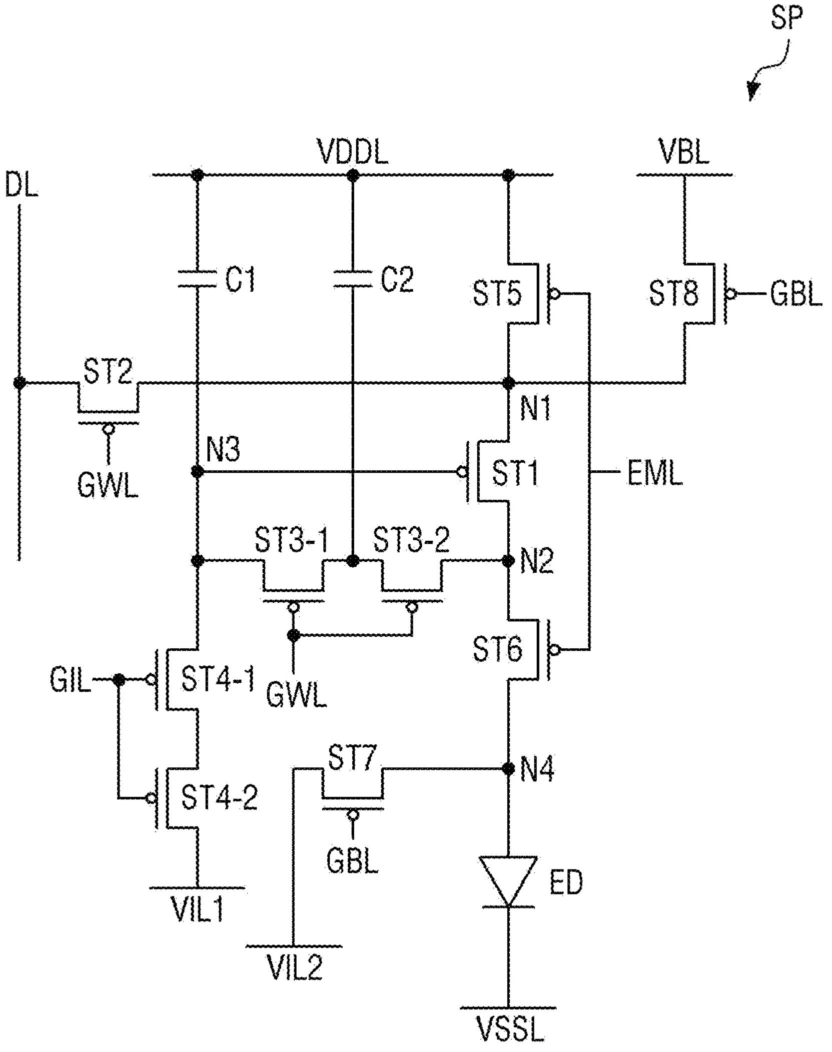
FIG. 6 is a circuit diagram illustrating a pixel of a display device according to some embodiments.

FIG. 6 is a circuit diagram illustrating a pixel of a display device according to some embodiments.

Referring to FIG. 6, the pixel SP may be connected to a first gate line GWL, a second gate line GCL, a third gate line GBL, the emission control line EML, the data line DL, the driving voltage line VDDL, a first initialization voltage line VIL1, a second initialization voltage line VIL2, a bias voltage line VBL, and a low potential line VSSL.

The pixel SP may include a light emitting element ED and a pixel circuit for driving the light emitting element ED. The pixel circuit may include first to eighth transistors ST1, ST2, ST3, ST4, ST5, ST6, ST7, and ST8 and first and second capacitors C1 and C2.

The first transistor ST1 may control a driving current supplied to the light emitting element ED. The first transistor ST1 may include a gate electrode, a first electrode, and a second electrode. The gate electrode of the first transistor ST1 may be connected to a third node N3, the first electrode thereof may be connected to a first node N1, and the second electrode thereof may be connected to a second node N2. For example, the first electrode of the first transistor ST1 may be a source electrode and the second electrode thereof may be a drain electrode, but embodiments according to the present disclosure are not limited thereto.

The first transistor ST1 may control a source-drain current Isd (hereinafter, referred to as "driving current") according to the data voltage applied to the gate electrode. The driving current Isd flowing through the channel of the first transistor ST1 may be proportional to the square of a difference between a threshold voltage Vth and a voltage Vsg between the source electrode and the gate electrode of the first transistor ST1 ($Isd=k\times(Vsg-Vth)^2$). Here, k is a proportional coefficient determined by the structure and physical characteristics of the first transistor ST1, Vsg is a source-gate voltage of the first transistor ST1, and Vth is a threshold voltage of the first transistor ST1.

The light emitting element ED may emit light by receiving the driving current Isd. The emission amount or the luminance of the light emitting element ED may be proportional to the magnitude of the driving current Isd. The light emitting element ED may include a first electrode, a second electrode, and a light emitting layer located between the first electrode and the second electrode. The first electrode of the light emitting element ED may be connected to a fourth node N4. The first electrode of the light emitting element ED may be connected to the second electrode of the sixth transistor ST6 and the first electrode of the seventh transistor ST7 through the fourth node N4. For example, the first electrode of the light emitting element ED may be an anode electrode or a pixel electrode, and the second electrode thereof may be a cathode electrode or a common electrode, but embodiments according to the present disclosure are not limited thereto. The second electrode of the light emitting element ED may be connected to the low potential line VSSL and may receive a low potential voltage from the low potential line VSSL.

The second transistor ST2 may be turned on by the first gate signal of the first gate line GWL to electrically connect the data line DL to the first node N1 which is the first electrode of the first transistor ST1. The second transistor ST2 may be turned on based on the first gate signal to supply the data voltage to the first node N1. The gate electrode of the second transistor ST2 may be connected to the first gate line GWL, the first electrode thereof may be connected to the data line DL, and the second electrode thereof may be connected to the first node N1. The second electrode of the second transistor ST2 may be connected to the first electrode of the first transistor ST1, the second electrode of the fifth transistor ST5, and the second electrode of the eighth transistor ST8 through the first node N1. For example, the first electrode of the second transistor ST2 may be a source electrode and the second electrode thereof may be a drain electrode, but embodiments according to the present disclosure are not limited thereto.

The third transistor ST3 may be turned on by the first gate signal of the first gate line GWL to electrically connect the second node N2, which is the second electrode of the first transistor ST1, to the third node N3, which is the gate electrode the first transistor ST1. The third transistor ST3 may include a third-first transistor ST3-1 and a third-second transistor ST3-2 connected in series. The third-first transistor ST3-1 and the third-second transistor ST3-2 may be connected in series between the third node N3 and the second node N2. The gate electrode of the third-first transistor ST3-1 and the gate electrode of the third-second transistor ST3-2 may be integrally formed and electrically connected to the first gate line GWL. The second electrode of the third-first transistor ST3-1 may be connected to the third node N3, and the first electrode of the third-second transistor ST3-2 may be connected to the second node N2. The first electrode of the third-first transistor ST3-1 and the second electrode of the third-second transistor ST3-2 may be integrally formed and connected to the first capacitor electrode of the second capacitor C2. For example, the first electrode of each of the third-first transistor ST3-1 and the third-second transistor ST3-2 may be a source electrode and the second electrode thereof may be a drain electrode, but embodiments according to the present disclosure are not limited thereto.

The fourth transistor ST4 may be turned on by a second gate signal of the second gate line GIL to electrically connect the third node N3, which is the gate electrode of the first transistor ST1, to the first initialization voltage line VIL1. The fourth transistor ST4 may be turned on based on the second gate signal, thereby discharging the gate electrode of the first transistor ST1 to a first initialization voltage. The fourth transistor ST4 may include a fourth-first transistor ST4-1 and a fourth-second transistor ST4-2 connected in series. The fourth-first transistor ST4-1 and the fourth-second transistor ST4-2 may be connected in series between the third node N3 and the first initialization voltage line VIL1. The gate electrode of the fourth-first transistor ST4-1 and the gate electrode of the fourth-second transistor ST4-2 may be integrally formed and connected to the second gate line GIL. The first electrode of the fourth-first transistor ST4-1 may be connected to the third node N3, and the second electrode of the fourth-second transistor ST4-2 may be connected to the first initialization voltage line VIL1. The second electrode of the fourth-first transistor ST4-1 and the first electrode of the fourth-second transistor ST4-2 may be integrally formed. For example, the first electrode of each of the fourth-first transistor ST4-1 and the fourth-second transistor ST4-2 may be a source electrode and the second electrode thereof may be a drain electrode, but embodiments according to the present disclosure are not limited thereto.

The fifth transistor ST5 may be turned on by an emission signal of the emission control line EML to electrically connect the driving voltage line VDDL with the first node N1 that is the first electrode of the first transistor ST1. The gate electrode of the fifth transistor ST5 may be connected to the emission control line EML, the first electrode thereof may be connected to the driving voltage line VDDL, and the second electrode thereof may be connected to the first node N1. The second electrode of the fifth transistor ST5 may be electrically connected to the first electrode of the first transistor ST1, the second electrode of the second transistor ST2, and the second electrode of the eighth transistor ST8 through the first node N1. For example, the first electrode of the fifth transistor ST5 may be a source electrode and the second electrode thereof may be a drain electrode, but embodiments according to the present disclosure are not limited thereto.

The sixth transistor ST6 may be turned on by the emission signal of the emission control line EML to electrically connect the second node N2 that is the second electrode of the first transistor ST1 with the fourth node N4 that is the first electrode of the light emitting element ED. The gate electrode of the sixth transistor ST6 may be connected to the emission control line EML, the first electrode thereof may be connected to the second node N2, and the second electrode thereof may be connected to the fourth node N4. The first electrode of the sixth transistor ST6 may be connected to the second electrode of the first transistor ST1 and the first electrode of the third-second transistor ST3-2 through the second node N2. The second electrode of the sixth transistor ST6 may be connected to the first electrode of the light emitting element ED and the first electrode of the seventh transistor ST7 through the fourth node N4. For example, the first electrode of the sixth transistor ST6 may be a source electrode and the second electrode thereof may be a drain electrode, but embodiments according to the present disclosure are not limited thereto.

When all of the fifth transistor ST5, the first transistor ST1, and the sixth transistor ST6 are turned on, the driving current Isd may be supplied to the plurality of light emitting elements ED.

The seventh transistor ST7 may be turned on by the third gate signal of the third gate line GBL to electrically connect the second initialization voltage line VIL2 to the fourth node N4, which is the first electrode of the light emitting element ED. By turning on the seventh transistor ST7 based on the third gate signal, the first electrode of the light emitting element ED may be discharged to a second initialization voltage. The gate electrode of the seventh transistor ST7 may be connected to the third gate line GBL, the first electrode thereof may be connected to the fourth node N4, and the second electrode thereof may be connected to the second initialization voltage line VIL2. The second electrode of the seventh transistor ST7 may be connected to the first electrode of the light emitting element ED and the second electrode of the sixth transistor ST6 through the fourth node N4. For example, the first electrode of the seventh transistor ST7 may be a source electrode and the second electrode thereof may be a drain electrode, but embodiments according to the present disclosure are not limited thereto.

The eighth transistor ST8 may be turned on by the third gate signal of the third gate line GBL to electrically connect the bias voltage line VBL with the first node N1 that is the source electrode of the first transistor ST1. The eighth transistor ST8 may be turned on based on the third gate signal to supply a bias voltage to the first node N1. The eighth transistor ST8 may improve hysteresis of the first transistor ST1 by supplying the bias voltage to the source electrode of the first transistor ST1. The gate electrode of the eighth transistor ST8 may be connected to the third gate line GBL, the first electrode thereof may be connected to the bias voltage line VBL, and the second electrode thereof may be connected to the fifth node N5. The second electrode of the eighth transistor ST8 may be electrically connected to the first electrode of the first transistor ST1, the second electrode of the second transistor ST2, and the second electrode of the fifth transistor ST5 through the first node N1. For example, the first electrode of the eighth transistor ST8 may be a source electrode and the second electrode thereof may be a drain electrode, but embodiments according to the present disclosure are not limited thereto.

Each of the first to eighth transistors ST1, ST2, ST3, ST4, ST5, ST6, ST7, and ST8 may include a silicon-based semiconductor region. For example, each of the first to eighth transistors ST1, ST2, ST3, ST4, ST5, ST6, ST7, and ST8 may include a semiconductor region made of low temperature polycrystalline silicon (LTPS). The semiconductor region made of low temperature polycrystalline silicon may have high electron mobility and excellent turn-on characteristics. That is, because the display device 10 includes the first to eighth transistors ST1, ST2, ST3, ST4, ST5, ST6, ST7, and ST8 having superior turn-on characteristics, it is possible to drive the plurality of pixels SP in a stable and efficient manner.

Each of the first to eighth transistors ST1, ST2, ST3, ST4, ST5, ST6, ST7, and ST8 may correspond to a p-type transistor. For example, each of the first to eighth transistors ST1, ST2, ST3, ST4, ST5, ST6, ST7, and ST8 may output a current flowing into the first electrode thereof to the second electrode thereof based on a gate low voltage applied to the gate electrode thereof.

The display device 10 may include the pixel circuit composed only of transistors having a silicon-based semiconductor region, thereby reducing the process time, saving the process cost, and minimizing or reducing the non-display area NDA, compared to a case including a pixel circuit composed of both a transistor having a silicon-based semiconductor region and a transistor having an oxide-based semiconductor region.

The first capacitor C1 may be connected between the third node N3, which is the gate electrode of the first transistor ST1, and the driving voltage line VDDL. For example, the first capacitor electrode of the first capacitor C1 may be connected to the third node N3, and the second capacitor electrode of the first capacitor C1 may be connected to the driving voltage line VDDL, thereby maintaining a potential difference between the driving voltage line VDDL and the gate electrode of the first transistor ST1.

The second capacitor C2 may be connected between the first electrode of the third-first transistor ST3-1 and the driving voltage line VDDL to reduce a kickback voltage. The second capacitor C2 may stably maintain the voltages of the first electrode of the third-first transistor ST3-1 and the second electrode of the third-second transistor ST3-2, which are integrally formed, thereby reducing leakage current flowing through the third-first transistor ST3-1 and the third-second transistor ST3-2.

Figure 7:
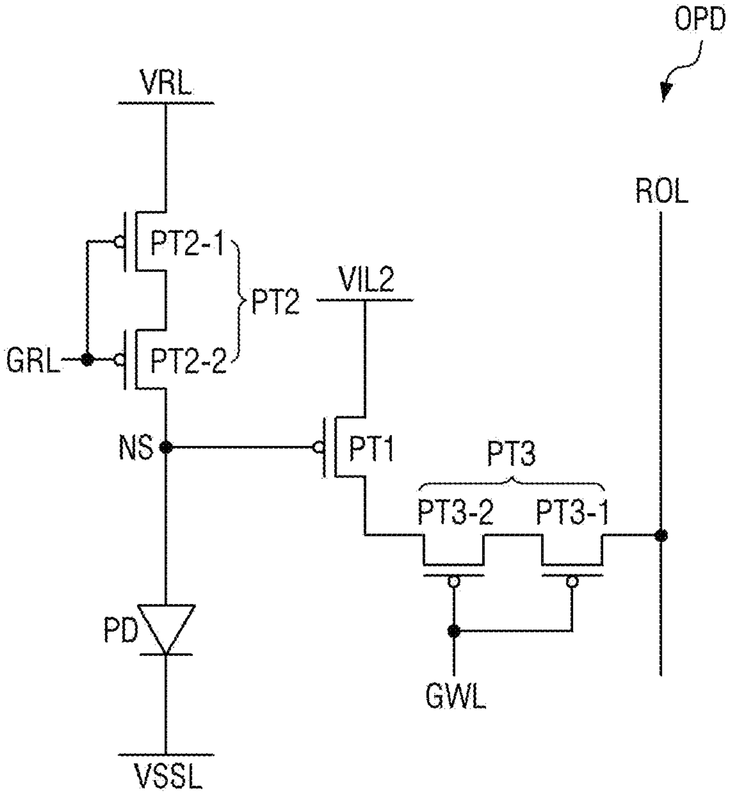
FIG. 7 is a circuit diagram of a fingerprint sensor of a display device according to some embodiments.

FIG. 7 is a circuit diagram of a fingerprint sensor of a display device according to some embodiments.

Referring to FIG. 7, the fingerprint sensor OPD may be connected to the first gate line GWL, a reset signal line GRL, a reset voltage line VRL, the second initialization voltage line VIL2, the read-out line ROL, and the low potential line VSSL.

The fingerprint sensor OPD may include a light receiving element PD and a sensor circuit for driving the light receiving element PD. The sensor circuit may include first to third sensor transistors PT1, PT2, and PT3.

The first sensor transistor PT1 may include a gate electrode, a first electrode, and a second electrode. The gate electrode of the first sensor transistor PT1 may be connected to a sensor node NS, the first electrode thereof may be connected to the third sensor transistor PT3, and the second electrode thereof may be connected to the second initialization voltage line VIL2. The first sensor transistor PT1 may control a source-drain current Isd (hereinafter referred to as "sensing current") based on the voltage of the sensor node NS, which is the first electrode of the light receiving element PD. The sensing current Isd flowing through the channel of the first sensor transistor PT1 may be proportional to the square of a difference between a threshold voltage Vth and a voltage Vsg between the source electrode and the gate electrode of the first sensor transistor PT1 ($Isd=k'\times(Vsg-Vth)^2$). Here, k' is a proportional coefficient determined by the structure and physical characteristics of the first sensor transistor PT1, Vsg is a source-gate voltage of the first sensor transistor PT1, and Vth is a threshold voltage of the first sensor transistor PT1. The first electrode of the first sensor transistor PT1 may be a source electrode and the second electrode thereof may be a drain electrode, but embodiments according to the present disclosure are not limited thereto.

The second sensor transistor PT2 may be turned on by the reset signal of the reset signal line GRL to supply a reset voltage to the sensor node NS. The second sensor transistor PT2 may include a second-first sensor transistor PT2-1 and a second-second sensor transistor PT2-2 connected in series. The second-first sensor transistor PT2-1 and the second-second sensor transistor PT2-2 may be connected in series between the reset voltage line VRL and the light receiving element PD. The gate electrode of the second-first sensor transistor PT2-1 and the gate electrode of the second-second sensor transistor PT2-2 may be integrally formed and electrically connected to the reset signal line GRL. The first electrode of the second-first sensor transistor PT2-1 may be connected to the reset voltage line VRL, and the second electrode of the second-second sensor transistor PT2-2 may be connected to the first electrode of the light receiving element PD. The second electrode of the second-first sensor transistor PT2-1 and the first electrode of the second-second sensor transistor PT2-2 may be integrally formed. The first electrode of each of the second-first sensor transistor PT2-1 and the second-second sensor transistor PT2-2 may be a source electrode and the second electrode thereof may be a drain electrode, but embodiments according to the present disclosure are not limited thereto.

The third sensor transistor PT3 may be turned on by the first gate signal of the first gate line GWL to electrically connect the first electrode of the first sensor transistor PT1 to the read-out line ROL. The third sensor transistor PT3 may include a third-first sensor transistor PT3-1 and a third-second sensor transistor PT3-2 connected in series. The third-first sensor transistor PT3-1 and the third-second sensor transistor PT3-2 may be connected in series between the first electrode of the first sensor transistor PT1 and the read-out line ROL. The gate electrode of the third-first sensor transistor PT3-1 and the gate electrode of the third-second sensor transistor PT3-2 may be integrally formed and electrically connected to the first gate line GWL. The first electrode of the third-first sensor transistor PT3-1 may be connected to the read-out line ROL, and the second electrode of the third-second sensor transistor PT3-2 may be connected to the first electrode of the first sensor transistor PT1. The second electrode of the third-first sensor transistor PT3-1 and the first electrode of the third-second sensor transistor PT3-2 may be integrally formed. The first electrode of each of the third-first sensor transistor PT3-1 and the third-second sensor transistor PT3-2 may be a source electrode and the second electrode thereof may be a drain electrode, but embodiments according to the present disclosure are not limited thereto.

The light receiving element PD may recognize the pattern of the user's fingerprint based on light reflected from the user's finger. The first electrode of the light receiving element PD may be connected to the sensor node NS, which is the gate electrode of the first sensor transistor PT1, and the second electrode thereof may be connected to the low potential line VSSL. The second electrode of the light receiving element PD may receive the low potential voltage from the low potential line VSSL.

When the user's finger touches the display panel 100, the light receiving element PD may receive light reflected by the ridges or valleys of the finger. The light outputted from the light emitting element ED may be reflected by the ridges or valleys of the finger, and the reflected light may reach the light receiving element PD. The light receiving element PD may convert the energy of light into an electrical signal (current or voltage) formed between the first and second electrodes, and the converted electrical signal may flow from the low potential line VSSL to the sensor node NS as a reverse bias current. For example, when the light receiving element PD receives light and an electric field is formed between the first and second electrodes of the light receiving element PD, a reverse bias current may flow through the light receiving element PD in proportion to the amount of light and the voltage at the sensor node NS may change. Accordingly, when the light receiving element PD receives light, the voltage at the sensor node NS may be reduced, and the sensing current (or source-drain current) may flow in the first sensor transistor PT1. The sensing current of the first sensor transistor PT1 may be applied to the display driver 200 as a sensing signal through the third sensor transistor PT3 and the read-out line ROL.

Each of the first to third sensor transistors PT1, PT2, and PT3 may include a silicon-based semiconductor region. For example, each of the first to third sensor transistors PT1, PT2, and PT3 may include a semiconductor region made of low temperature polycrystalline silicon (LTPS). The semiconductor region made of low temperature polycrystalline silicon may have high electron mobility and excellent turn-on characteristics. Accordingly, the display device 10 includes the first to third sensor transistors PT1, PT2, and PT3 having excellent turn-on characteristics, thereby stably and efficiently driving the plurality of fingerprint sensors OPD.

Each of the first to third sensor transistors PT1, PT2, and PT3 may correspond to a p-type transistor. For example, each of the first to third sensor transistors PT1, PT2, and PT3 may output a current flowing through the first electrode to the second electrode based on the gate low voltage applied to the gate electrode.

The display device 10 may include the sensor circuit composed only of sensor transistors having a silicon-based semiconductor region, thereby reducing the process time, saving the process cost, and minimizing or reducing the non-display area NDA, compared to a case including a sensor circuit composed of both a sensor transistor having a silicon-based semiconductor region and a sensor transistor having an oxide-based semiconductor region.

Figure 8:
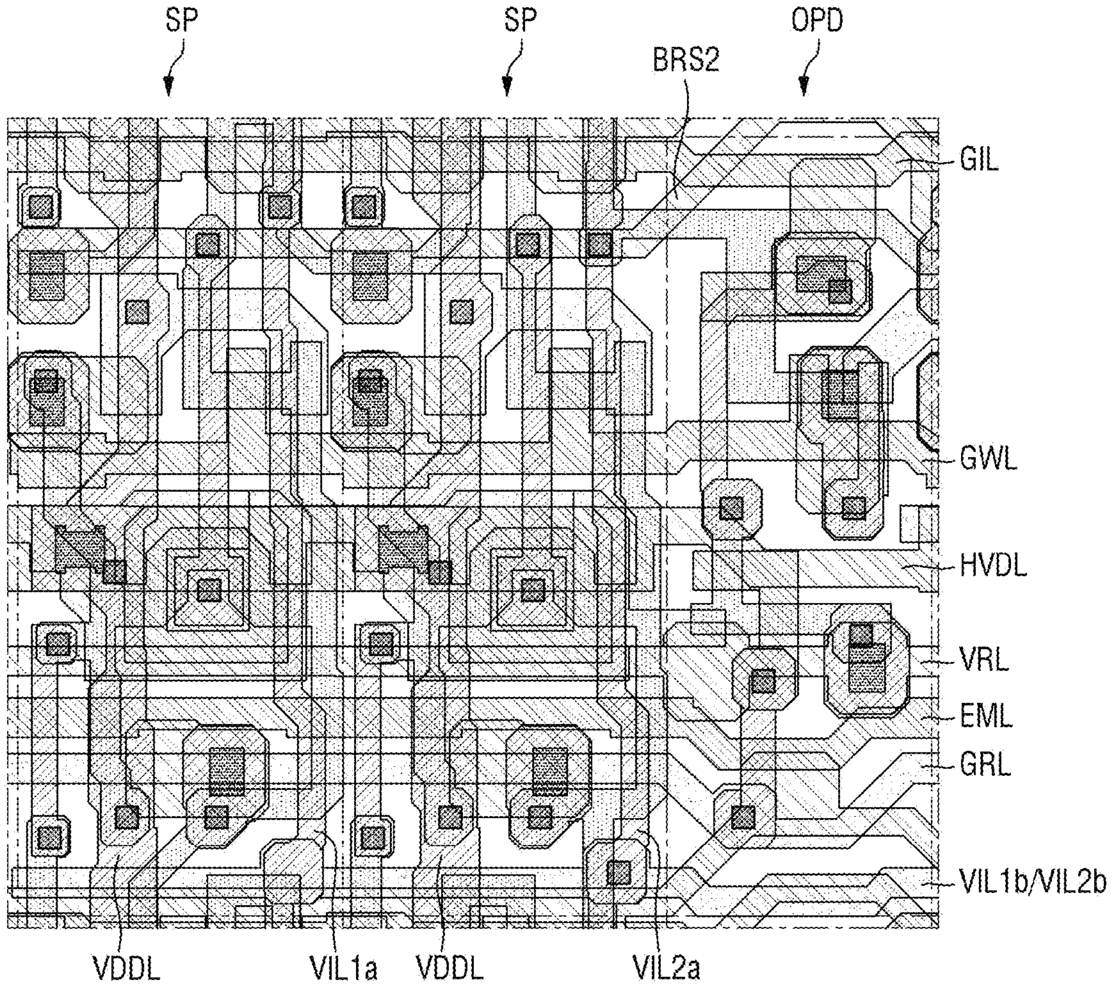
FIG. 8 is a layout diagram showing pixels and a fingerprint sensor of a display device according to some embodiments.
Figure 9:
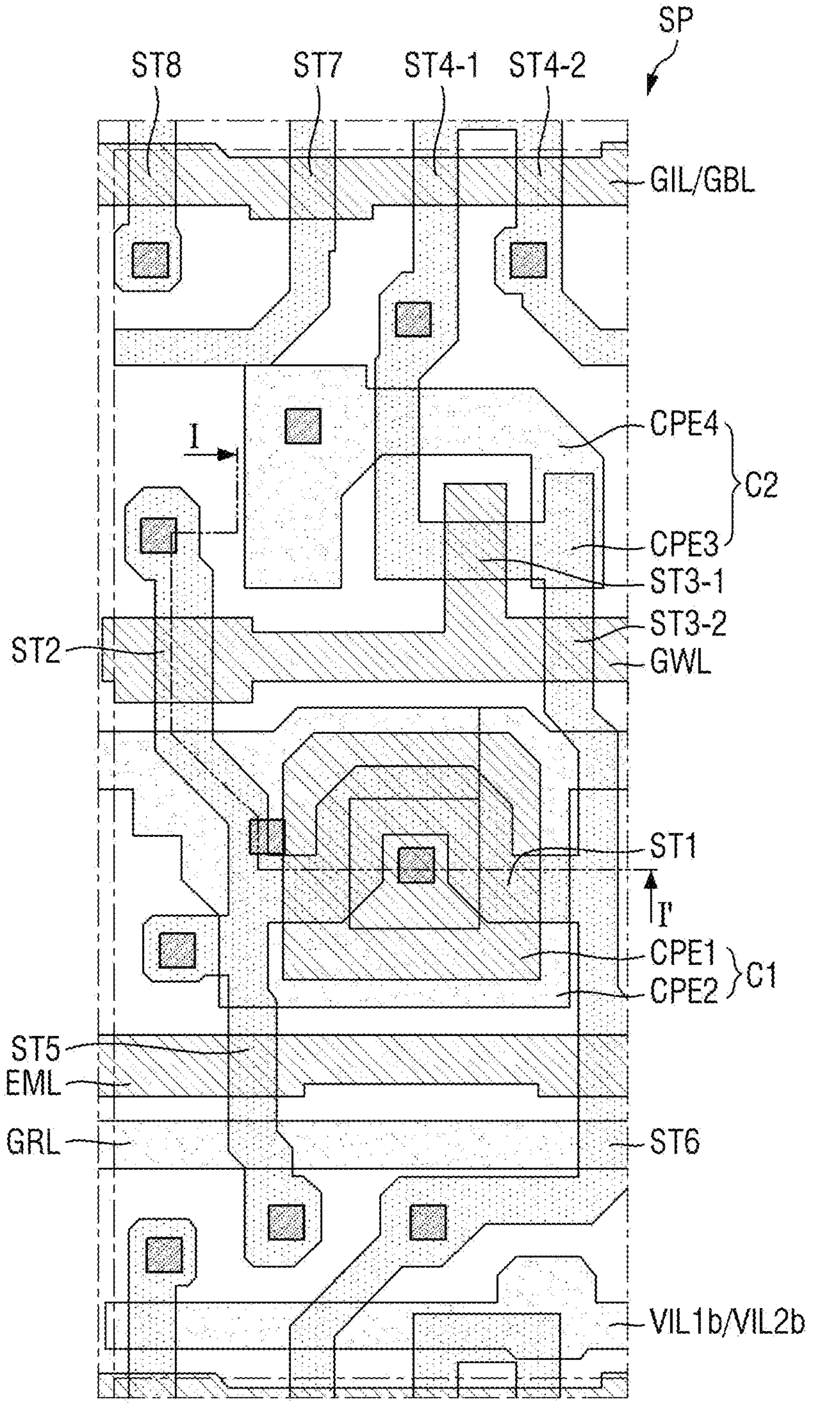
FIG. 9 is a layout diagram illustrating an active layer, a first gate layer, and a second gate layer of a pixel in a display device according to some embodiments.
Figure 10:
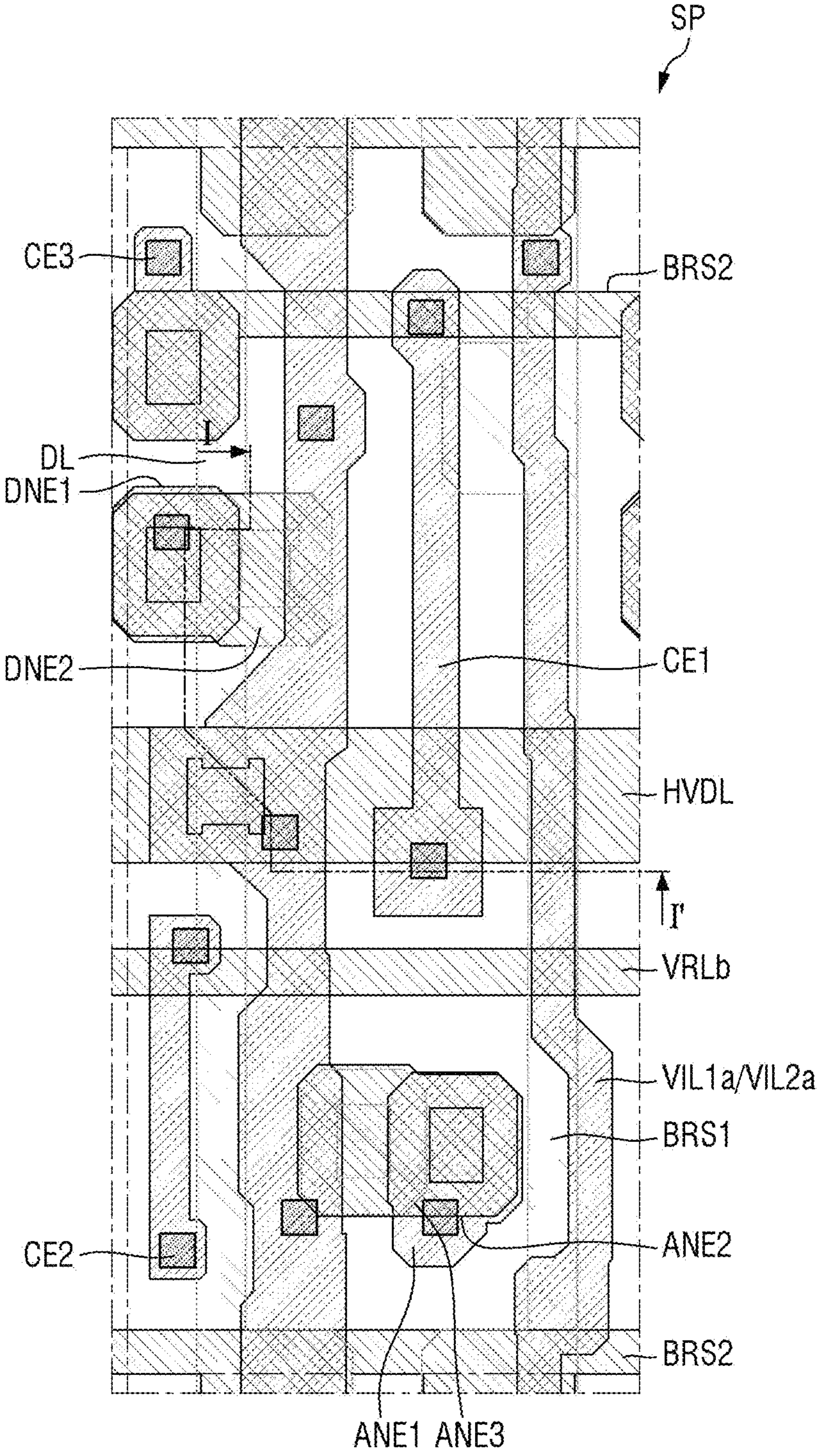
FIG. 10 is a layout diagram illustrating a first source metal layer, a second source metal layer, and a third source metal layer of a pixel in a display device according to some embodiments.
Figure 11:
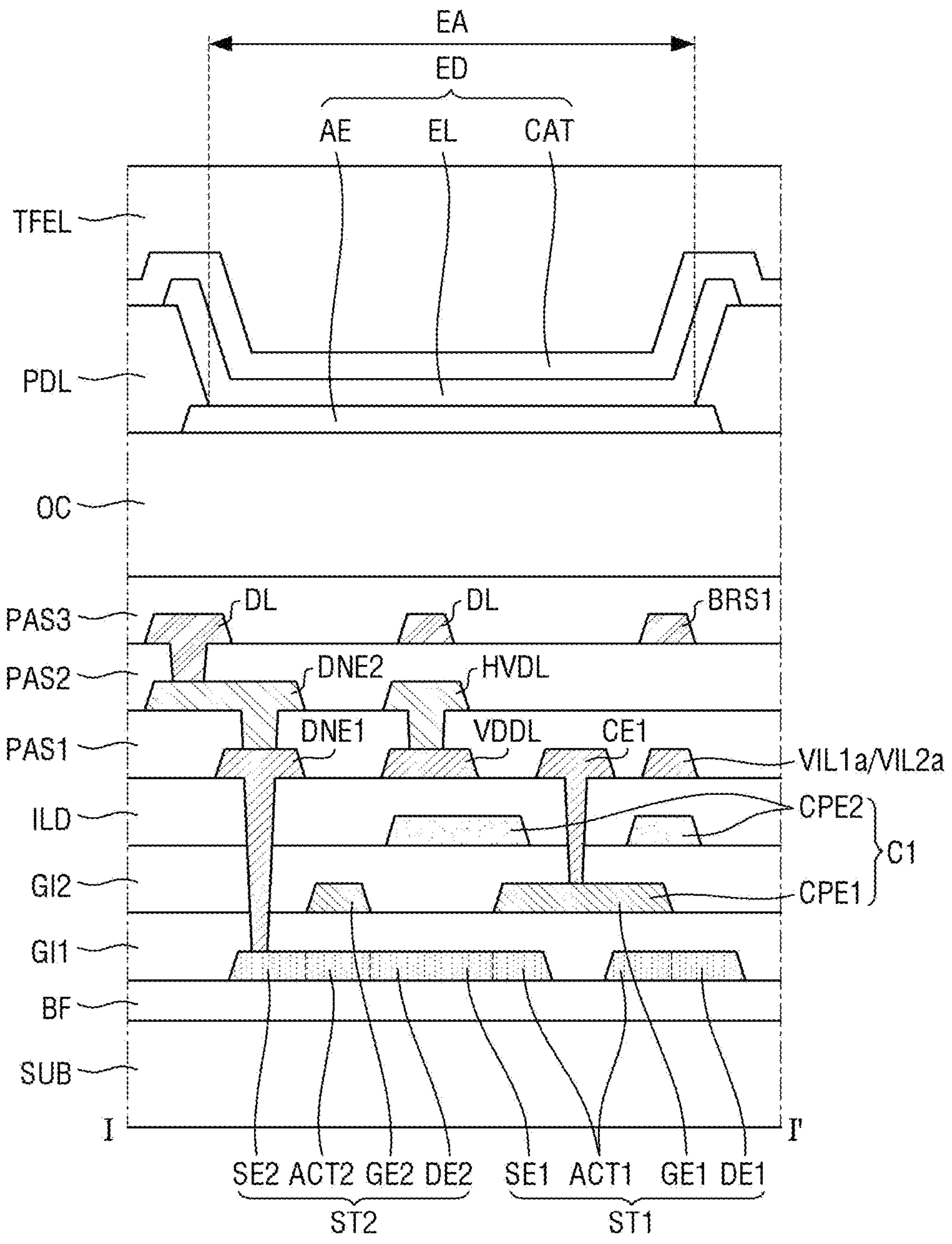
FIG. 11 is a cross-sectional view taken along the lines I-I' of FIGS. 9 and 10.

FIG. 8 is a layout diagram showing pixels and a fingerprint sensor of a display device according to some embodiments. FIG. 9 is a layout diagram illustrating an active layer, a first gate layer, and a second gate layer of a pixel in a display device according to some embodiments. FIG. 10 is a layout diagram illustrating a first source metal layer, a second source metal layer, and a third source metal layer of a pixel in a display device according to some embodiments. FIG. 11 is a cross-sectional view taken along the lines I-I' of FIGS. 9 and 10.

Referring to FIGS. 8 to 11, the display area DA may include the plurality of pixels SP and the fingerprint sensor OPD. The pixel circuit of the pixel SP and the sensor circuit of the fingerprint sensor OPD may be located in the same layer and share the gate line GL and the power line VL. The light emitting element ED of the pixel SP and the light receiving element PD of the fingerprint sensor OPD may be located in the same layer, and may share a common electrode CAT corresponding to the second electrode of the light emitting element ED and the second electrode of the light receiving element PD.

The pixel SP may include a light emitting element ED and a pixel circuit for driving the light emitting element ED. The pixel circuit may include the first to eighth transistors ST1, ST2, ST3, ST4, ST5, ST6, ST7, and ST8 and the first and second capacitors C1 and C2.

The first transistor ST1 may include a semiconductor region ACT1, a gate electrode GE1, a first electrode SE1, and a second electrode DE1. The semiconductor region ACT1, the first electrode SE1, and the second electrode DE1 of the first transistor ST1 may be located in an active layer ACTL, and the gate electrode GE1 of the first transistor ST1 may be located in a first gate layer GTL1. The gate electrode GE1 of the first transistor ST1 may be a part of a first capacitor electrode CPE1 of the first gate layer GTL1 and may overlap the semiconductor region ACT1 of the first transistor ST1.

The first capacitor electrode CPE1 may be electrically connected to the second electrode of the third-first transistor ST3-1 and the first electrode of the fourth-first transistor ST4-1 through a first connection electrode CE1 of a first source metal layer SDL1. The first electrode SE1 of the first transistor ST1 may be formed integrally with the second electrode DE2 of the second transistor ST2 and the second electrode of the fifth transistor ST5. The first electrode SE1 of the first transistor ST1 may be electrically connected to the second electrode of the eighth transistor ST8 through a second connection electrode CE2 of the first source metal layer SDL1. The second electrode DE1 of the first transistor ST1 may be formed integrally with the first electrode of the third-second transistor ST3-2 and the first electrode of the sixth transistor ST6.

The second transistor ST2 may include a semiconductor region ACT2, a gate electrode GE2, a first electrode SE2, and a second electrode DE2. The semiconductor region ACT2, the first electrode SE2, and the second electrode DE2 of the second transistor ST2 may be located in the active layer ACTL, and the gate electrode GE2 thereof may be located in the first gate layer GTL1. The gate electrode GE2 of the second transistor ST2 may overlap the semiconductor region ACT2 of the second transistor ST2 and may be a part of the first gate line GWL. The first gate line GWL may be located in the first gate layer GTL1 and extend in the X-axis direction. The first electrode SE2 of the second transistor ST2 may be electrically connected to the data line DL of a third source metal layer SDL3 through a first data connection electrode DNE1 of the first source metal layer SDL1 and a second data connection electrode DNE2 of a second source metal layer SDL2. The data line DL may be located in the third source metal layer SDL3 and extend in the Y-axis direction. The second electrode DE2 of the second transistor ST2 may be formed integrally with the first electrode SE1 of the first transistor ST1 and the second electrode of the fifth transistor ST5. The second electrode DE2 of the second transistor ST2 may be electrically connected to the second electrode of the eighth transistor ST8 through the second connection electrode CE2 of the first source metal layer SDL1.

The third transistor ST3 may include the third-first transistor ST3-1 and the third-second transistor ST3-2 connected in series. Each of the third-first transistor ST3-1 and the third-second transistor ST3-2 may include a semiconductor region, a gate electrode, a first electrode, and a second electrode. The semiconductor region, the first electrode, and the second electrode of each of the third-first transistor ST3-1 and the third-second transistor ST3-2 may be located in the active layer ACTL, and the gate electrode thereof may be located in the first gate layer GTL1. The gate electrode of the third-first transistor ST3-1 may overlap the semiconductor region of the third-first transistor ST3-1, and the gate electrode of the third-second transistor ST3-2 may overlap the semiconductor region of the third-second transistor ST3-2.

The gate electrode of the third-first transistor ST3-1 and the gate electrode of the third-second transistor ST3-2 may be integrally formed. The gate electrode of the third-second transistor ST3-2 may be a part of the first gate line GWL extending in the X-axis direction, and the gate electrode of the third-first transistor ST3-1 may be a part of a protrusion that protrudes in the Y-axis direction from the first gate line GWL. The second electrode of the third-first transistor ST3-1 may be formed integrally with the first electrode of the fourth-first transistor ST4-1, and may be electrically connected to the first capacitor electrode CPE1 of the first gate layer GTL1 through the first connection electrode CE1 of the first source metal layer SDL1. The first electrode of the third-first transistor ST3-1, the second electrode of the third-second transistor ST3-2, and a first capacitor electrode CPE3 of the second capacitor C2 may be integrally formed. The second capacitor C2 may stably maintain the voltages of the first electrode of the third-first transistor ST3-1 and the second electrode of the third-second transistor ST3-2, thereby reducing leakage current flowing through the third-first transistor ST3-1 and the third-second transistor ST3-2. The first electrode of the third-second transistor ST3-2 may be formed integrally with the second electrode DE1 of the first transistor ST1 and the first electrode of the sixth transistor ST6.

The fourth transistor ST4 may include a fourth-first transistor ST4-1 and a fourth-second transistor ST4-2 connected in series. Each of the fourth-first transistor ST4-1 and the fourth-second transistor ST4-2 may include a semiconductor region, a gate electrode, a first electrode, and a second electrode. The semiconductor region, the first electrode, and the second electrode of each of the fourth-first transistor ST4-1 and the fourth-second transistor ST4-2 may be located in the active layer ACTL, and the gate electrode thereof may be located in the first gate layer GTL1. The gate electrode of the fourth-first transistor ST4-1 may overlap the semiconductor region of the fourth-first transistor ST4-1, and the gate electrode of the fourth-second transistor ST4-2 may overlap the semiconductor region of the fourth-second transistor ST4-2.

The gate electrode of the fourth-first transistor ST4-1 and the gate electrode of the fourth-second transistor ST4-2 may be integrally formed and may be a part of the second gate line GIL. The second gate line GIL may be located in the first gate layer GTL1 and extend in the X-axis direction. The first electrode of the fourth-first transistor ST4-1 may be formed integrally with the second electrode of the third-first transistor ST3-1, and may be electrically connected to the first capacitor electrode CPE1 of the first gate layer GTL1 through the first connection electrode CE1 of the first source metal layer SDL1. The second electrode of the fourth-first transistor ST4-1 and the first electrode of the fourth-second transistor ST4-2 may be integrally formed. The second electrode of the fourth-second transistor ST4-2 may be electrically connected to the first initialization voltage line VIL1.

The first initialization voltage line VIL1 may include a first vertical initialization voltage line VIL1*a* and a first horizontal initialization voltage line VIL1*b*. The first vertical initialization voltage line VIL1*a* may be located in the first source metal layer SDL1 and extend in the Y-axis direction. The first vertical initialization voltage line VIL1*a* may be in contact with the second electrode of the fourth-second transistor ST4-2. The first vertical initialization voltage line VIL1*a* may be located in some of a plurality of pixel columns. The first horizontal initialization voltage line VIL1*b* may be located in a second gate layer GTL2 and extend in the X-axis direction. The first horizontal initialization voltage line VIL1*b* may be located in some of a plurality of pixel rows. A plurality of first vertical initialization voltage lines VIL1*a* and a plurality of first horizontal initialization voltage lines VIL1*b* may be connected in a mesh shape. Accordingly, the first initialization voltage line VIL1 may supply a first initialization voltage to the second electrode of the fourth-second transistor ST4-2.

The fifth transistor ST5 may include a semiconductor region, a gate electrode, a first electrode, and a second electrode. The semiconductor region, the first electrode, and the second electrode of the fifth transistor ST5 may be located in the active layer ACTL, and the gate electrode of the fifth transistor ST5 may be located in the first gate layer GTL1. The gate electrode of the fifth transistor ST5 may overlap the semiconductor region of the fifth transistor ST5.

The gate electrode of the fifth transistor ST5 may be a part of the emission control line EML. The emission control line EML may be located in the first gate layer GTL1 and extend in the X-axis direction. The first electrode of the fifth transistor ST5 may be connected to the driving voltage line VDDL of the first source metal layer SDL1. The driving voltage line VDDL may be located in the first source metal layer SDL1 and extend in the Y-axis direction. The driving voltage line VDDL may supply a driving voltage to the first electrode of the fifth transistor ST5. A horizontal voltage line HVDL may be located in the second source metal layer SDL2 and extend in the X-axis direction. A plurality of driving voltage lines VDDL and a plurality of horizontal voltage lines HVDL may be connected in a mesh shape. The second electrode of the fifth transistor ST5 may be formed integrally with the first electrode SE1 of the first transistor ST1 and the second electrode DE2 of the second transistor ST2. The second electrode of the fifth transistor ST5 may be electrically connected to the second electrode of the eighth transistor ST8 through the second connection electrode CE2 of the first source metal layer SDL1.

The sixth transistor ST6 may include a semiconductor region, a gate electrode, a first electrode, and a second electrode. The semiconductor region, the first electrode, and the second electrode of the sixth transistor ST6 may be located in the active layer ACTL, and the gate electrode of the sixth transistor ST6 may be located in the first gate layer GTL1. The gate electrode of the sixth transistor ST6 may overlap the semiconductor region of the sixth transistor ST6.

The gate electrode of the sixth transistor ST6 may be a part of the emission control line EML. The emission control line EML may be located in the first gate layer GTL1 and extend in the X-axis direction. The first electrode of the sixth transistor ST6 may be formed integrally with the second electrode DE1 of the first transistor ST1 and the first electrode of the third-second transistor ST3-2. The second electrode of the sixth transistor ST6 may be formed integrally with the first electrode of the seventh transistor ST7, and may be electrically connected to the first electrode or pixel electrode AE of the light emitting element ED through a first anode connection electrode ANE1 of the first source metal layer SDL1, a second anode connection electrode ANE2 of the second source metal layer SDL2, and a third anode connection electrode ANE3 of the third source metal layer SDL3.

The second electrode or common electrode CAT of the light emitting element ED may be electrically connected to the low potential line VSSL and may receive a low potential voltage from the low potential line VSSL.

The seventh transistor ST7 may include a semiconductor region, a gate electrode, a first electrode, and a second electrode. The semiconductor region, the first electrode, and the second electrode of the seventh transistor ST7 may be located in the active layer ACTL, and the gate electrode of the seventh transistor ST7 may be located in the first gate layer GTL1. The gate electrode of the seventh transistor ST7 may overlap the semiconductor region of the seventh transistor ST7.

The gate electrode of the seventh transistor ST7 may be a part of the third gate line GBL. The third gate line GBL may be located in the first gate layer GTL1 and extend in the X-axis direction. The first electrode of the seventh transistor ST7 may be formed integrally with the second electrode of the sixth transistor ST6, and may be electrically connected to the first electrode or pixel electrode AE of the light emitting element ED through the first to third anode connection electrodes ANE1, ANE2, and ANE3. The second electrode of the seventh transistor ST7 may be electrically connected to the second initialization voltage line VIL2.

The second initialization voltage line VIL2 may include a second vertical initialization voltage line VIL2*a* and a second horizontal initialization voltage line VIL2*b*. The second vertical initialization voltage line VIL2*a* may be located in the first source metal layer SDL1 and extend in the Y-axis direction. The second vertical initialization voltage line VIL2*a* may be located in some other pixel columns of the plurality of pixel columns. The second horizontal initialization voltage line VIL2*b* may be located in the second gate layer GTL2 and extend in the X-axis direction. The second horizontal initialization voltage line VIL2*b* may be located in some other pixel rows of the plurality of pixel rows. A plurality of second vertical initialization voltage lines VIL2*a* and a plurality of second horizontal initialization voltage lines VIL2*b* may be connected in a mesh shape. Accordingly, the second initialization voltage line VIL2 may supply a second initialization voltage to the second electrode of the seventh transistor ST7.

The eighth transistor ST8 may include a semiconductor region, a gate electrode, a first electrode, and a second electrode. The semiconductor region, the first electrode, and the second electrode of the eighth transistor ST8 may be located in the active layer ACTL, and the gate electrode of the eighth transistor ST8 may be located in the first gate layer GTL1. The gate electrode of the eighth transistor ST8 may overlap the semiconductor region of the eighth transistor ST8.

The gate electrode of the eighth transistor ST8 may be a part of the third gate line GBL. The third gate line GBL may be located in the first gate layer GTL1 and extend in the X-axis direction. The first electrode of the eighth transistor ST8 may be electrically connected to the second bridge line BRS2 through a third connection electrode CE3 of the first source metal layer SDL1. Here, the second bridge line BRS2 electrically connected to the eighth transistor ST8 may correspond to the bias voltage line VBL. The second electrode of the eighth transistor ST8 may be electrically connected to the first electrode SE1 of the first transistor ST1, the second electrode DE2 of the second transistor ST2, and the second electrode of the fifth transistor ST5 through the second connection electrode CE2 of the first source metal layer SDL1.

The bridge line BRS may include the first bridge line BRS1 and the second bridge line BRS2. The first bridge line BRS1 may be located in the third source metal layer SDL3 and extend in the Y-axis direction. The second bridge line BRS2 may be located in the second source metal layer SDL2, may be connected to the first bridge line BRS1, and may extend in the X-axis direction or in a direction opposite to the X-axis direction. The bridge line BRS may be electrically connected to each of the data line DL, the power line VL, and the read-out line ROL. As the display device 10 includes the bridge line BRS, the fan-out line extending from the display driver 200 to the display area DA may be omitted and the size of the non-display area NDA may be minimized or reduced.

The first capacitor C1 may include a first capacitor electrode CPE1 and a second capacitor electrode CPE2. The first capacitor electrode CPE1 may be located in the first gate layer GTL1 and formed integrally with the gate electrode GE1 of the first transistor ST1, and may be electrically connected to the second electrode of the third-first transistor ST3-1 and the first electrode of the fourth-first transistor ST4-1.

The second capacitor electrode CPE2 may be located in the second gate layer GTL2 and connected to the driving voltage line VDDL of the first source metal layer SDL1. Accordingly, the second capacitor electrode CPE2 may receive a driving voltage from the driving voltage line VDDL.

The second capacitor C2 may include the first capacitor electrode CPE3 and a second capacitor electrode CPE4. The first capacitor electrode CPE3 of the second capacitor C2 may be located in the active layer ACTL and formed integrally with the first electrode of the third-first transistor ST3-1 and the second electrode of the third-second transistor ST3-2.

The second capacitor electrode CPE4 of the second capacitor C2 may be located in the second gate layer GTL2 and connected to the driving voltage line VDDL of the first source metal layer SDL1. Accordingly, the second capacitor electrode CPE4 of the second capacitor C2 may receive a driving voltage from the driving voltage line VDDL.

In FIG. 11, the display panel 100 may include the substrate SUB, the transistor layer TFTL, the light emitting element layer EDL, and the encapsulation layer TFEL.

The substrate SUB may be a base substrate or a base member. The substrate SUB may be a flexible substrate which can be bent, folded or rolled. For example, the substrate SUB may include a polymer resin such as polyimide (PI), but is not limited thereto. For another example, the substrate SUB may include a glass material or a metal material.

The thin film transistor layer TFTL may include a buffer layer BF, the active layer ACTL, a first gate insulating layer GI1, the first gate layer GTL1, a second gate insulating layer GI2, the second gate layer GTL2, an interlayer insulating layer ILD, the first source metal layer SDL1, a first passivation layer PAS1, the second source metal layer SDL2, a second passivation layer PAS2, the third source metal layer SDL3, a third passivation layer PAS3, and a planarization layer OC.

The buffer layer BF may be located on the substrate SUB. The buffer layer BF may include an inorganic insulating material capable of preventing or reducing permeation of air, contaminants, or moisture. The buffer layer BF may include at least one of a silicon nitride layer, a silicon oxynitride layer, a silicon oxide layer, a titanium oxide layer, an aluminum oxide layer, or an amorphous silicon layer, but embodiments according to the present disclosure are not limited thereto.

The active layer ACTL may be located on the buffer layer BF. The active layer ACTL may include the semiconductor region ACT1, the first electrode SE1, and the second electrode DE1 of the first transistor ST1, and the semiconductor region ACT2, the first electrode SE2, and the second electrode DE2 of the second transistor ST2.

The first gate insulating layer GI1 may be located on the active layer ACTL and the buffer layer BF. The first gate insulating layer GI1 may insulate the active layer ACTL from the first gate layer GTL1. The first gate insulating layer GI1 may include at least one of a silicon nitride layer, a silicon oxynitride layer, a silicon oxide layer, a titanium oxide layer, an aluminum oxide layer, or an amorphous silicon layer, but embodiments according to the present disclosure are not limited thereto.

The first gate layer GTL1 may be located on the first gate insulating layer GI1. The first gate layer GTL1 may include the gate electrode GE1 of the first transistor ST1, the gate electrode GE2 of the second transistor ST2, and the first capacitor electrode CPE1.

The second gate insulating layer GI2 may be located on the first gate layer GTL1 and the first gate insulating layer GI1. The second gate insulating layer GI2 may insulate the first gate layer GTL1 from the second gate layer GTL2. The second gate insulating layer GI2 may be made of a material in the first gate insulating layer GI1.

The second gate layer GTL2 may be located on the second gate insulating layer GI2. The second gate layer GTL2 may include a second capacitor electrode CPE2.

The interlayer insulating layer ILD may be located on the second gate layer GTL2 and the second gate insulating layer GI2. The interlayer insulating layer ILD may insulate the second gate layer GTL2 from the first source metal layer SDL1.

The first source metal layer SDL1 may be located on the interlayer insulating layer ILD. The first source metal layer SDL1 may include the first data connection electrode DNE1, the driving voltage line VDDL, the first connection electrode CE1, the first vertical initialization voltage line VIL1*a*, and the second vertical initialization voltage line VIL2*a*.

The first passivation layer PAS1 may be located on the first source metal layer SDL1 and the interlayer insulating layer ILD. The first passivation layer PAS1 may insulate the first source metal layer SDL1 from the second source metal layer SDL2.

The second source metal layer SDL2 may be located on the first passivation layer PAS1. The second source metal layer SDL2 may include the second data connection electrode DNE2 and the horizontal voltage line HVDL.

The second passivation layer PAS2 may be located on the second source metal layer SDL2 and the first passivation layer PAS1. The second passivation layer PAS2 may insulate the second source metal layer SDL2 from the third source metal layer SDL3.

The third source metal layer SDL3 may be located on the second passivation layer PAS2. The third source metal layer SDL3 may include the data line DL and the first bridge line BRS1.

The third passivation layer PAS3 may be located on the third source metal layer SDL3 and the second passivation layer PAS2. The third passivation layer PAS3 may protect the pixel circuit of the pixels SP.

The planarization layer OC may be located on the third passivation layer PAS3. The planarization layer OC may planarize the top of the thin film transistor layer TFTL. The planarization layer OC may contain an organic insulating material such as polyimide (PI).

The light emitting element layer EDL may include a pixel defining layer PDL and the light emitting element ED.

The pixel defining layer PDL may be located on the planarization layer OC. The pixel defining layer PDL may define a plurality of emission areas EA or a plurality of opening areas. The pixel defining layer PDL may separate and insulate the pixel electrodes AE of the plurality of pixels SP.

The light emitting element ED may be located on the planarization layer OC. The light emitting element ED of each of the plurality of pixels SP may include the pixel electrode AE, a light emitting layer EL, and the common electrode CAT. The pixel electrode AE may be located on the planarization layer OC. The pixel electrode AE may overlap one of the plurality of emission areas EA defined by the pixel defining layer PDL. The pixel electrode AE may receive a driving current from the pixel circuit of the pixel SP.

The light emitting layer EL may be located on the pixel electrode AE. For example, the light emitting layer EL may be an organic light emitting layer made of an organic material, but is not limited thereto. In the case where the light emitting layer EL corresponds to an organic light emitting layer, when a voltage (e.g., a set or predetermined voltage) is applied to the pixel electrode AE in the pixel circuit of the pixel SP, and the common electrode CAT receives a common voltage or a cathode voltage, holes may move to the organic light emitting layer EL through the hole transporting layer, electrons may move to the organic light emitting layer EL through the electron transporting layer, and the holes and the electrons may combine with each other in the organic light emitting layer EL to emit light.

The common electrode CAT may be arranged on the light emitting layer EL. For example, the common electrode CAT may be made in the form of an electrode common to all of the pixels SP, rather than being specific to each of the pixels SP. The common electrode CAT may be located on the light emitting layer EL in the plurality of emission areas EA, and may be located on the pixel defining layer PDL in an area excluding the plurality of emission areas EA.

The encapsulation layer TFEL may be located on the common electrode CAT to cover the plurality of light emitting elements ED. The encapsulation layer TFEL may include at least one inorganic layer to prevent or reduce instances of contaminants, oxygen, or moisture permeating into the plurality of light emitting elements ED. The encapsulation layer TFEL may include at least one organic layer to protect the plurality of light emitting elements ED from foreign matters such as dust.

Figure 12:
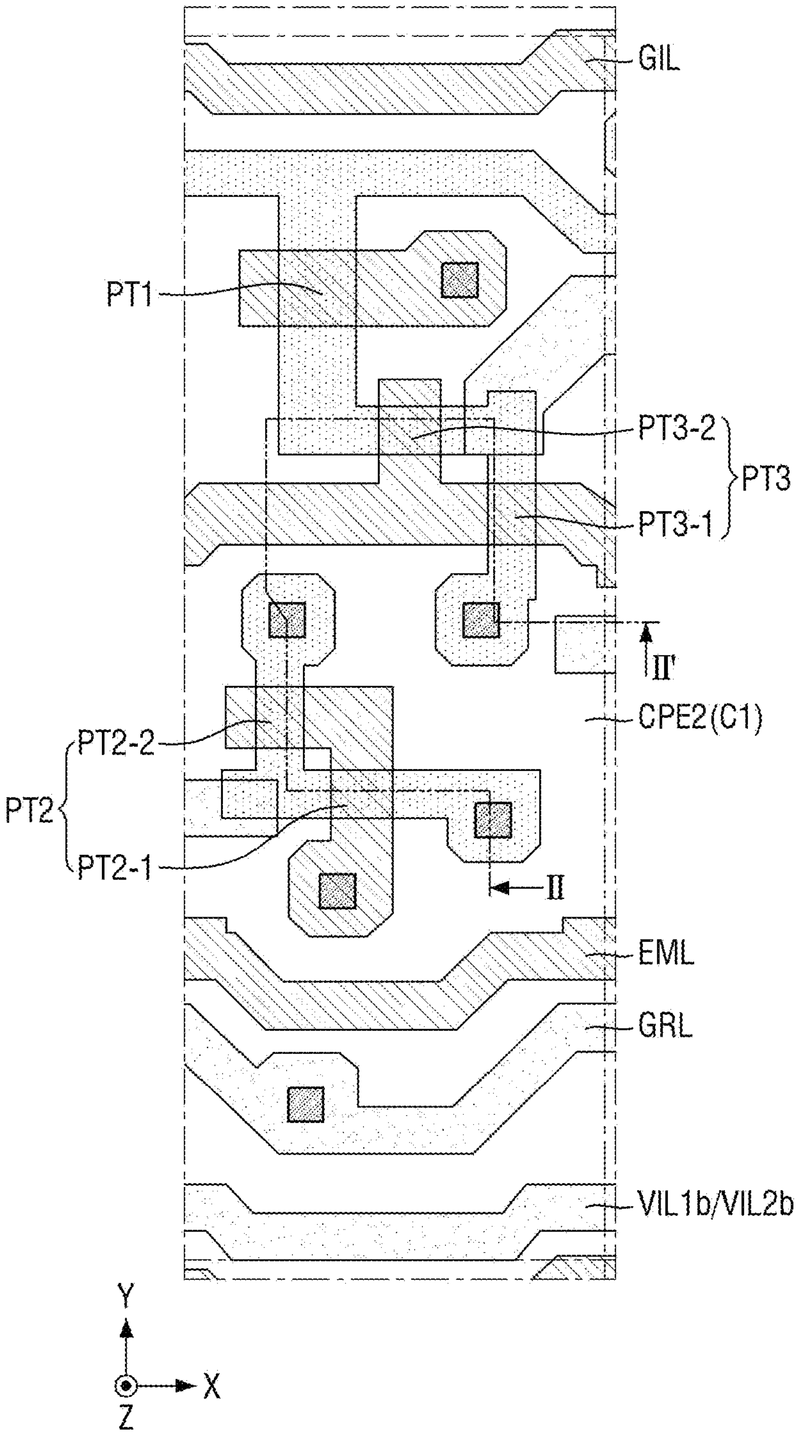
FIG. 12 is a layout diagram illustrating an active layer, a first gate layer, and a second gate layer of a fingerprint sensor in a display device according to some embodiments.
Figure 13:
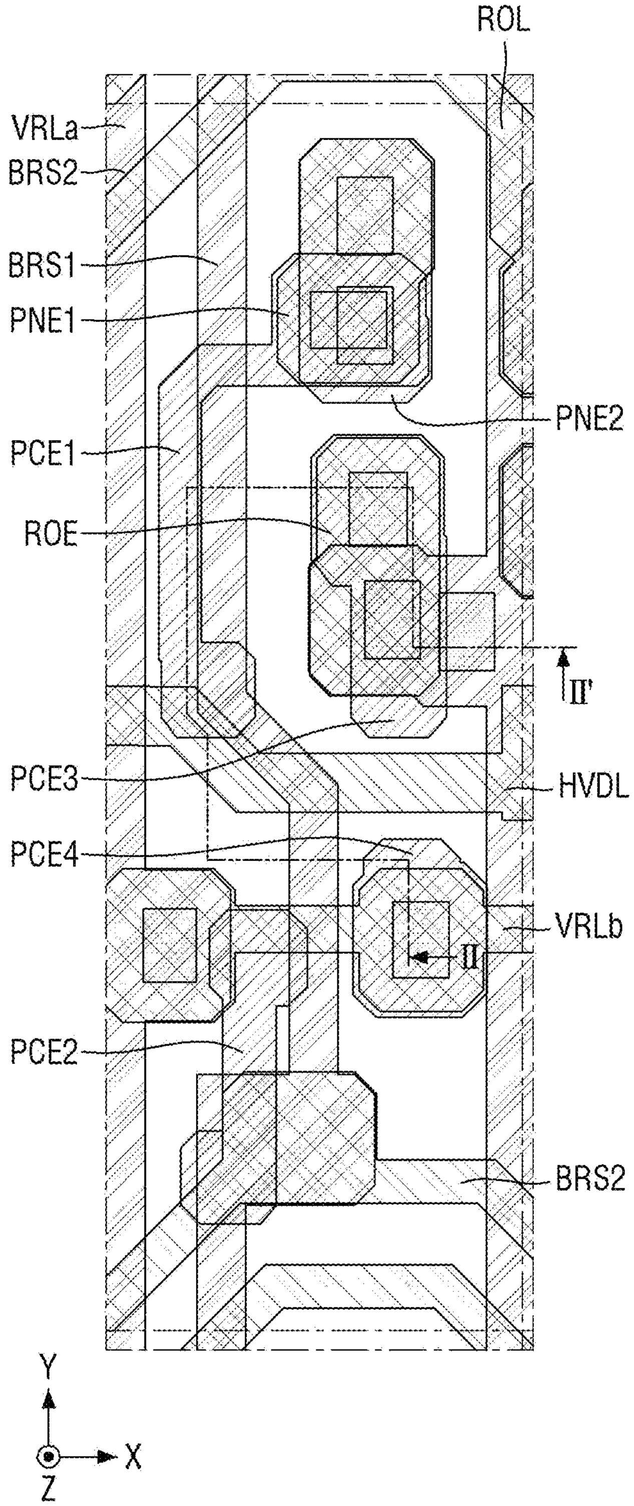
FIG. 13 is a layout diagram illustrating a first source metal layer, a second source metal layer, and a third source metal layer of a fingerprint sensor in a display device according to some embodiments.
Figure 14:
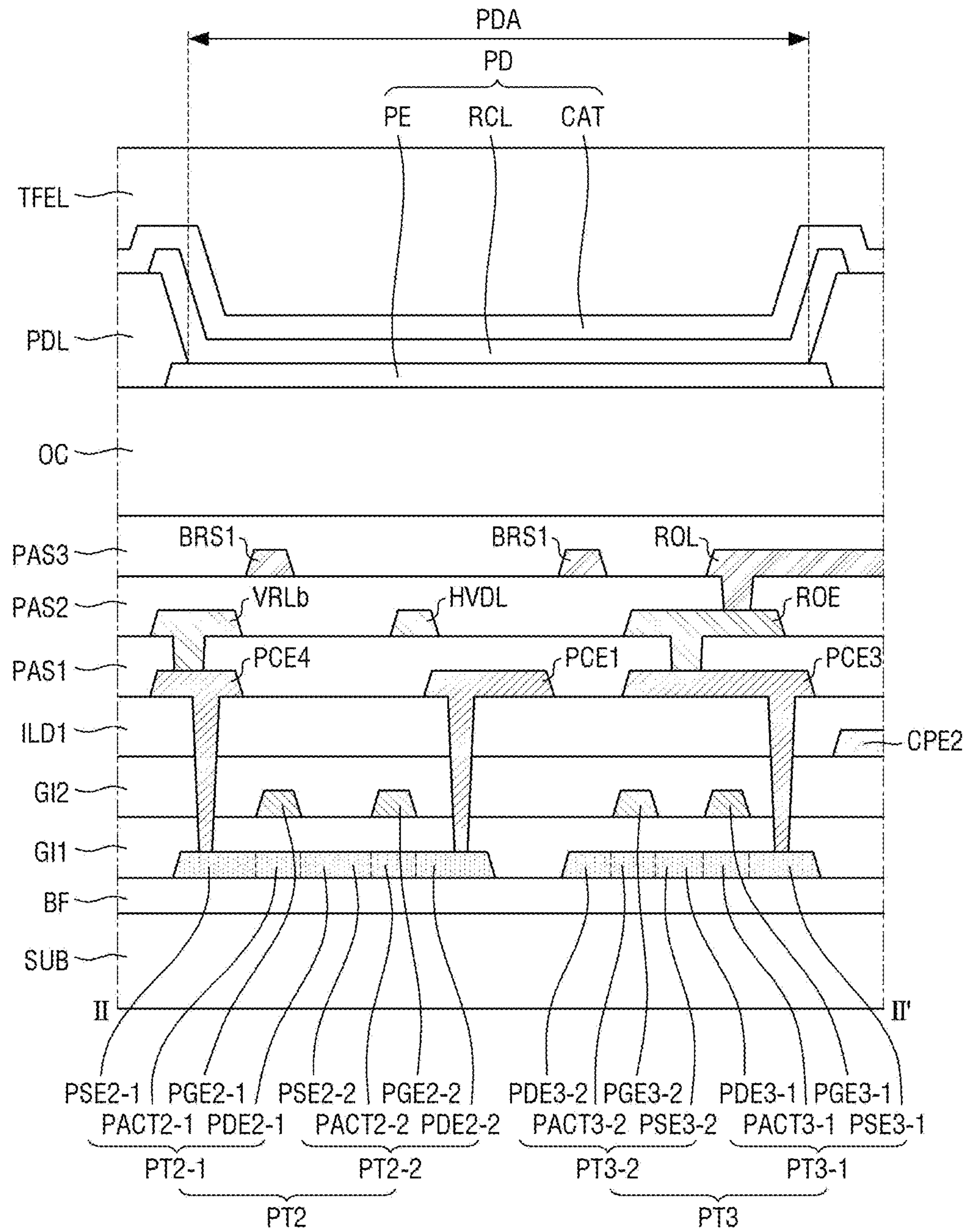
FIG. 14 is a cross-sectional view taken along the lines II-II' of FIGS. 12 and 13.

FIG. 12 is a layout diagram illustrating an active layer, a first gate layer, and a second gate layer of a fingerprint sensor in a display device according to some embodiments. FIG. 13 is a layout diagram illustrating a first source metal layer, a second source metal layer, and a third source metal layer of a fingerprint sensor in a display device according to some embodiments. FIG. 14 is a cross-sectional view taken along the lines II-II' of FIGS. 12 and 13. Hereinafter, the same configuration as the above-described configuration will be briefly described, or some description thereof may be omitted.

Referring to FIGS. 12 to 14, the fingerprint sensor OPD may include the light receiving element PD and the sensor circuit for driving the light receiving element PD. The sensor circuit may include the first to third sensor transistors PT1, PT2, and PT3. The fingerprint sensor OPD may be connected to the first gate line GWL, the reset signal line GRL, the reset voltage line VRL, the second initialization voltage line VIL2, and the read-out line ROL.

The first gate line GWL may be located in the first gate layer GTL1 and extend in the X-axis direction. The first gate line GWL may supply a first gate signal to the gate electrode of the third sensor transistor PT3.

The reset signal line GRL may be located in the second gate layer GTL2 and extend in the X-axis direction. The reset signal line GRL may supply a reset signal to the gate electrode of the second sensor transistor PT2 through a second sensor connection electrode PCE2 of the first source metal layer SDL1.

The reset voltage line VRL may supply a reset voltage to a first electrode PSE2-1 of the second-first sensor transistor PT2-1. The reset voltage line VRL may include a vertical reset voltage line VRLa and a horizontal reset voltage line VRLb. The vertical reset voltage line VRLa may be located in the third source metal layer SDL3 and extend in the Y-axis direction. The vertical reset voltage line VRLa may be arranged in parallel with the read-out line ROL. The vertical reset voltage line VRLa may be connected to the horizontal reset voltage line VRLb of the second source metal layer SDL2.

The horizontal reset voltage line VRLb may be located in the second source metal layer SDL2 and extend in the X-axis direction. The horizontal reset voltage line VRLb may supply a reset voltage to the first electrode PSE2-1 of the second-first sensor transistor PT2-1 through a fourth sensor connection electrode PCE4 of the first source metal layer SDL1.

The second initialization voltage line VIL2 may include the second vertical initialization voltage line VIL2*a* and the second horizontal initialization voltage line VIL2*b*. The second horizontal initialization voltage line VIL2*b* may be located in the second gate layer GTL2 and extend in the X-axis direction. The second horizontal initialization voltage line VIL2*b* may be located in some other pixel rows of the plurality of pixel rows. The plurality of second vertical initialization voltage lines VIL2*a* and the plurality of second horizontal initialization voltage lines VIL2*b* may be connected in a mesh shape. Accordingly, the second initialization voltage line VIL2 may supply a second initialization voltage to the second electrode of the first sensor transistor PT1.

The first sensor transistor PT1 may include a semiconductor region, a gate electrode, a first electrode, and a second electrode. The semiconductor region, the first electrode, and the second electrode of the first sensor transistor PT1 may be located in the active layer ACTL, and the gate electrode of the first sensor transistor PT1 may be located in the first gate layer GTL1. The gate electrode of the first sensor transistor PT1 may overlap the semiconductor region of the first sensor transistor PT1.

The gate electrode of the first sensor transistor PT1 may be electrically connected to a second electrode PDE2-2 of the second-second sensor transistor PT2-2 through a first sensor connection electrode PCE1 located in the first source metal layer SDL1. The first sensor connection electrode PCE1 may be electrically connected to the first electrode or sensor electrode PE of the light receiving element PD through a first sensor anode connection electrode PNE1 located in the second source metal layer SDL2 and a second sensor anode connection electrode PNE2 located in the third source metal layer SDL3. The first sensor connection electrode PCE1, the first sensor anode connection electrode PNE1, and the second sensor anode connection electrode PNE2 may correspond to the sensor node NS of FIG. 7. The first electrode of the first sensor transistor PT1 may be formed integrally with a second electrode PDE3-2 of the third-second sensor transistor PT3-2. The second electrode of the first sensor transistor PT1 may be electrically connected to the second initialization voltage line VIL2.

The second sensor transistor PT2 may include the second-first sensor transistor PT2-1 and the second-second sensor transistor PT2-2 connected in series. The second-first sensor transistor PT2-1 and the second-second sensor transistor PT2-2 may include semiconductor regions PACT2-1 and PACT2-2, gate electrodes PGE2-1 and PGE2-2, first electrodes PSE2-1 and PSE2-2, and second electrodes PDE2-1 and PDE2-2, respectively. The semiconductor regions PACT2-1 and PACT2-2, the first electrodes PSE2-1 and PSE2-2, and the second electrodes PDE2-1 and PDE2-2 of the second-first and second-second sensor transistors PT2-1 and PT2-2 may be located in the active layer ACTL, and the gate electrodes PGE2-1 and PGE2-2 thereof may be located in the first gate layer GTL1. The gate electrode PGE2-1 of the second-first sensor transistor PT2-1 may overlap the semiconductor region PACT2-1 of the second-first sensor transistor PT2-1, and the gate electrode PGE2-2 of the second-second sensor transistor PT2-2 may overlap the semiconductor region PACT2-2 of the second-second sensor transistor PT2-2.

The gate electrode PGE2-1 of the second-first sensor transistor PT2-1 and the gate electrode PGE2-2 of the second-second sensor transistor PT2-2 may be integrally formed. The gate electrode PGE2-1 of the second-first sensor transistor PT2-1 and the gate electrode PGE2-2 of the second-second sensor transistor PT2-2 may be electrically connected to the reset signal line GRL of the second gate layer GTL2 through the second sensor connection electrode PCE2 of the first source metal layer SDL1. The first electrode PSE2-1 of the second-first sensor transistor PT2-1 may be electrically connected to the horizontal reset voltage line VRLb of the second source metal layer SDL2 through the fourth sensor connection electrode PCE4 of the first source metal layer SDL1. The second electrode PDE2-1 of the second-first sensor transistor PT2-1 and the first electrode PSE2-2 of the second-second sensor transistor PT2-2 may be integrally formed. The second electrode PDE2-2 of the second-second sensor transistor PT2-2 may be electrically connected to the gate electrode of the first sensor transistor PT1 through the first sensor connection electrode PCE1 of the first source metal layer SDL1.

The third sensor transistor PT3 may include the third-first sensor transistor PT3-1 and the third-second sensor transistor PT3-2 connected in series. The third-first sensor transistor PT3-1 and the third-second sensor transistor PT3-2 may include semiconductor regions PACT3-1 and PACT3-2, gate electrodes PGE3-1 and PGE3-2, first electrodes PSE3-1 and PSE3-2, and second electrodes PDE3-1 and PDE3-2, respectively. The semiconductor regions PACT3-1 and PACT3-2, the first electrodes PSE3-1 and PSE3-2, and the second electrodes PDE3-1 and PDE3-2 of the third-first and third-second sensor transistors PT3-1 and PT3-2 may be located in the active layer ACTL, and the gate electrodes PGE3-1 and PGE3-2 thereof may be located in the first gate layer GTL1. The gate electrode PGE3-1 of the third-first sensor transistor PT3-1 may overlap the semiconductor region PACT3-1 of the third-first sensor transistor PT3-1, and the gate electrode PGE3-2 of the third-second sensor transistor PT3-2 may overlap the semiconductor region PACT3-2 of the third-second sensor transistor PT3-2.

The gate electrode PGE3-1 of the third-first sensor transistor PT3-1 and the gate electrode PGE3-2 of the third-second sensor transistor PT3-2 may be integrally formed.

The gate electrode PGE3-1 of the third-first sensor transistor PT3-1 may be a part of the first gate line GWL extending in the X-axis direction, and the gate electrode PGE3-2 of the third-second sensor transistor PT3-2 may be a part of a protrusion that protrudes in the Y-axis direction from the first gate line GWL. The first electrode PSE3-1 of the third-first sensor transistor PT3-1 may be electrically connected to the read-out line ROL of the third source metal layer SDL3 through a third sensor connection electrode PCE3 of the first source metal layer SDL1 and a read-out electrode ROE of the second source metal layer SDL2. The read-out line ROL may be located in the third source metal layer SDL3 and extend in the Y-axis direction, and may supply a sensing signal of the fingerprint sensor OPD to the display driver 200. The second electrode PDE3-1 of the third-first sensor transistor PT3-1 and the first electrode PSE3-2 of the third-second sensor transistor PT3-2 may be integrally formed. The second electrode PDE3-2 of the third-second sensor transistor PT3-2 may be formed integrally with the first electrode of the first sensor transistor PT1.

The light emitting element layer EDL may include the pixel defining layer PDL and the light receiving element PD. The light receiving element PD may be located on the planarization layer OC. The light receiving element PD of each of the plurality of fingerprint sensors OPD may include the sensor electrode PE, a light receiving layer RCL, and the common electrode CAT. The sensor electrode PE may be located on the planarization layer OC and may be located in the same layer as the pixel electrode AE of the pixel SP. The sensor electrode PE may overlap one of the plurality of sensor areas PDA defined by the pixel defining layer PDL.

The light receiving layer RCL may be located on the sensor electrode PE. When the user's finger touches the display panel 100, the light receiving layer RCL may receive light reflected by the ridges or valleys of the finger. Light outputted from the light emitting element ED may be reflected by the ridges or valleys of the finger, and the reflected light may reach the light receiving layer RCL. The light receiving element PD may convert the energy of light into an electrical signal (current or voltage) formed between the first and second electrodes, and the converted electrical signal may flow from the low potential line VSSL to the sensor node NS as a reverse bias current. For example, when the light receiving element PD receives light and an electric field is formed between the first and second electrodes of the light receiving element PD, a reverse bias current may flow through the light receiving element PD in proportion to the amount of light and the voltage at the sensor node NS may change. Accordingly, when the light receiving element PD receives light, the voltage at the sensor node NS may be reduced, and a sensing current (or source-drain current) may flow in the first sensor transistor PT1. The sensing current of the first sensor transistor PT1 may be applied to the display driver 200 as a sensing signal through the third sensor transistor PT3 and the read-out line ROL.

The common electrode CAT may be located on the light receiving layer RCL. For example, the common electrode CAT may be implemented in the form of an electrode that is common to all fingerprint sensors OPD, rather than being specific to each of the fingerprint sensors OPD. The common electrode CAT may be located on the light receiving layer RCL in the plurality of sensor areas PDA, and may be located on the pixel defining layer PDL in areas other than the plurality of sensor areas PDA.

Figure 15:
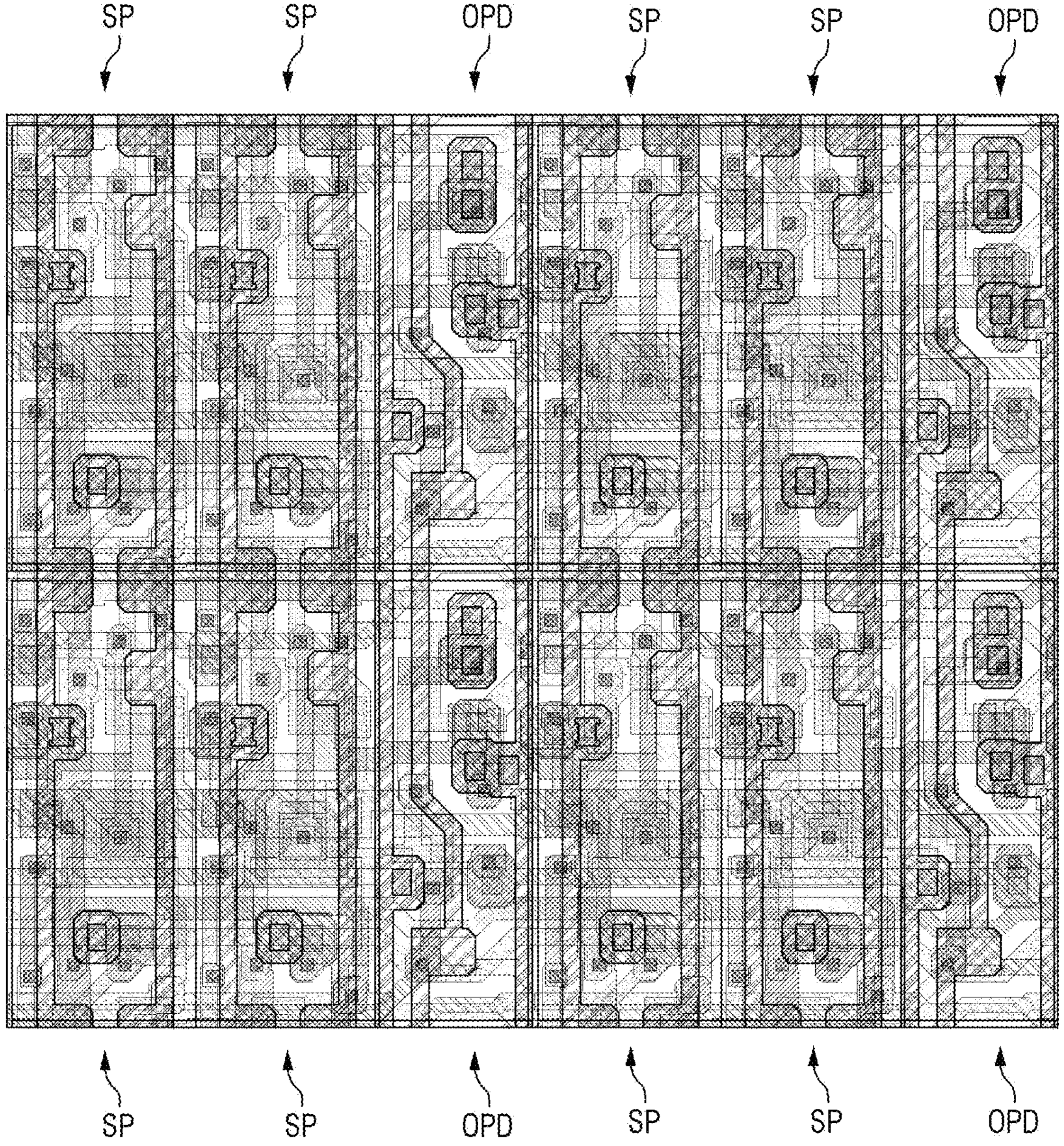
FIG. 15 is a diagram illustrating one example of the arrangement of a pixel circuit and a sensor circuit in a display device according to some embodiments.
Figure 16:
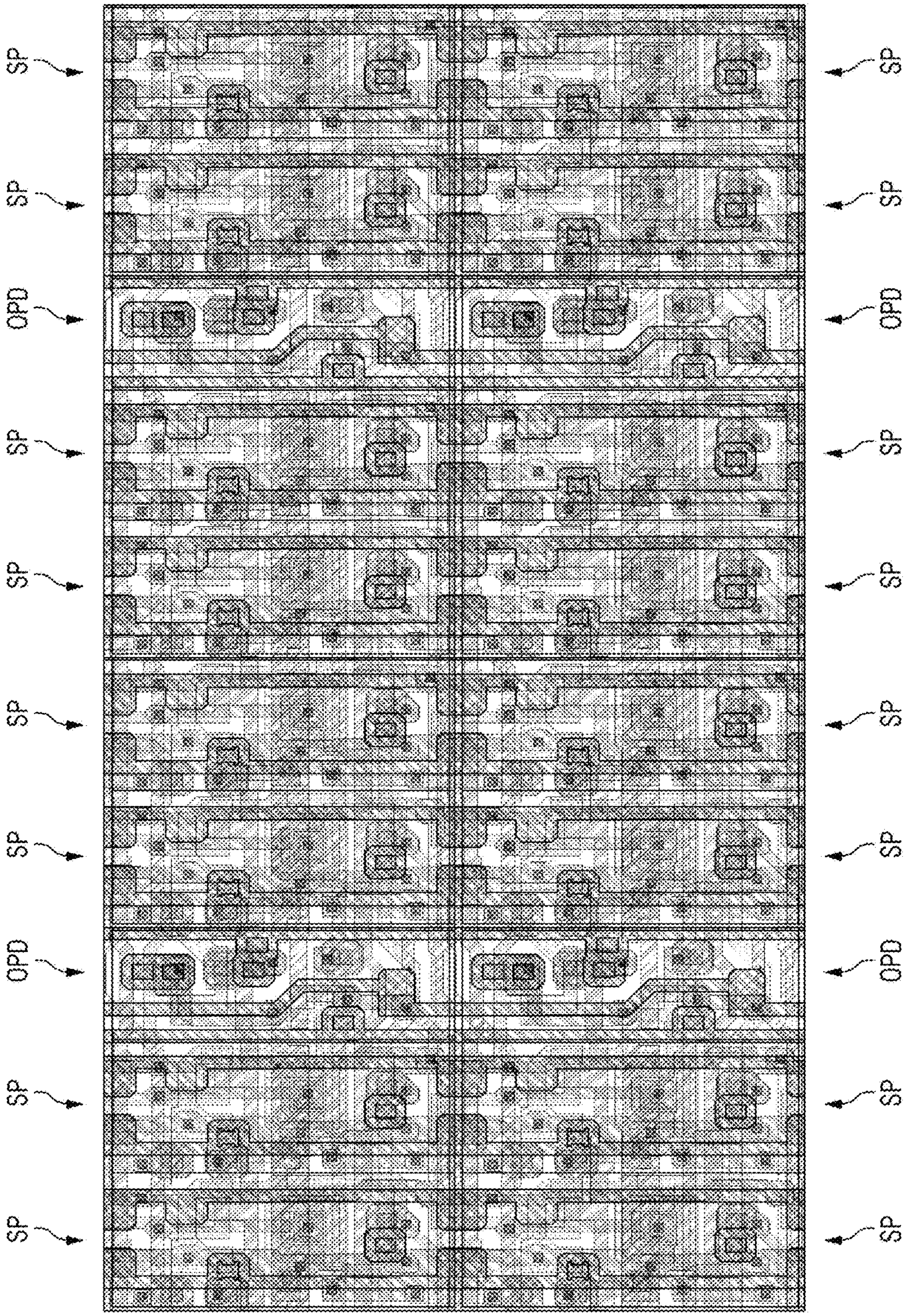
FIG. 16 is a diagram illustrating another example of the arrangement of a pixel circuit and a sensor circuit in a display device according to some embodiments.
Figure 17:
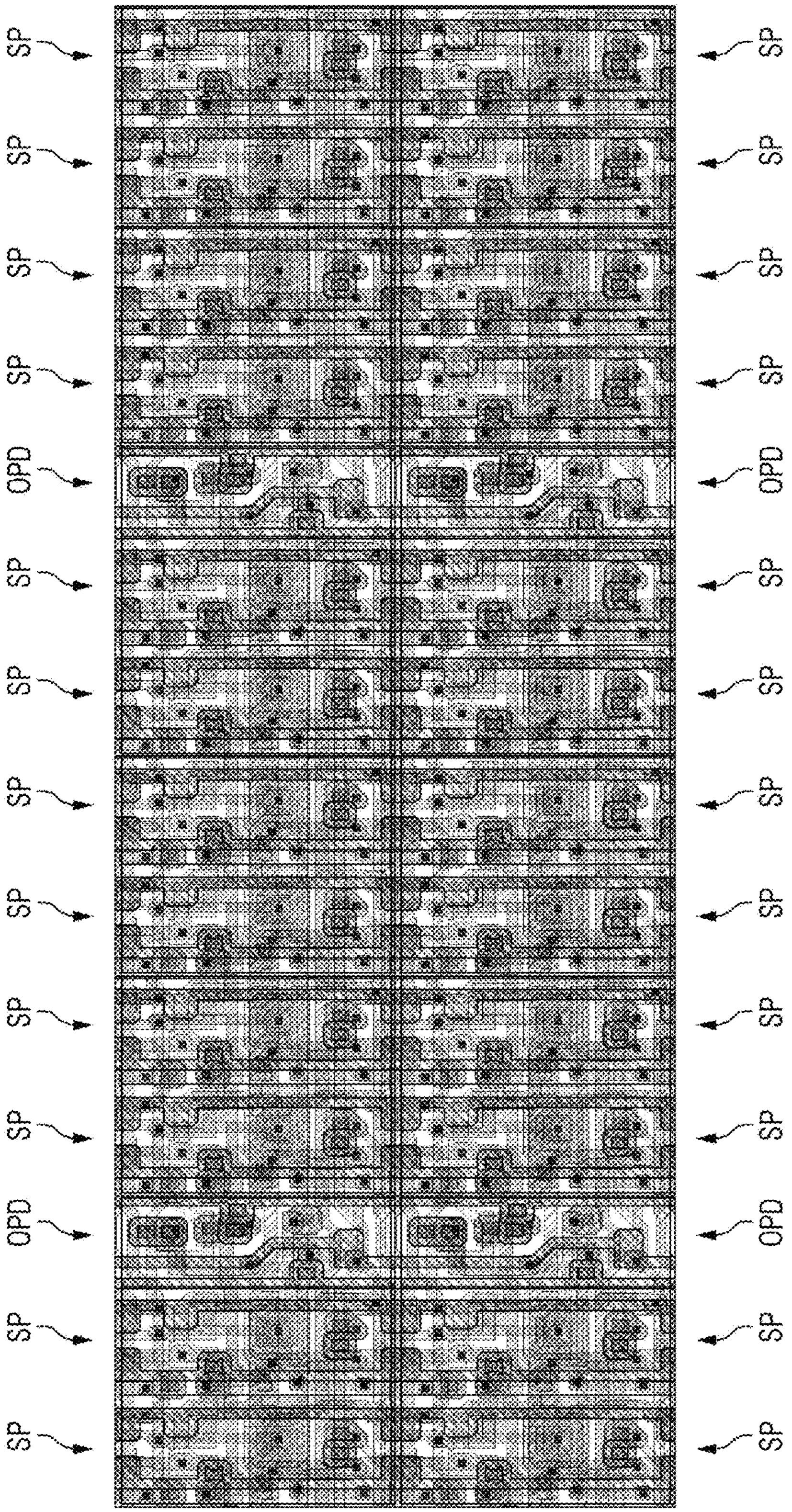
FIG. 17 is a diagram illustrating still another example of the arrangement of a pixel circuit and a sensor circuit in a display device according to some embodiments.
Figure 18:
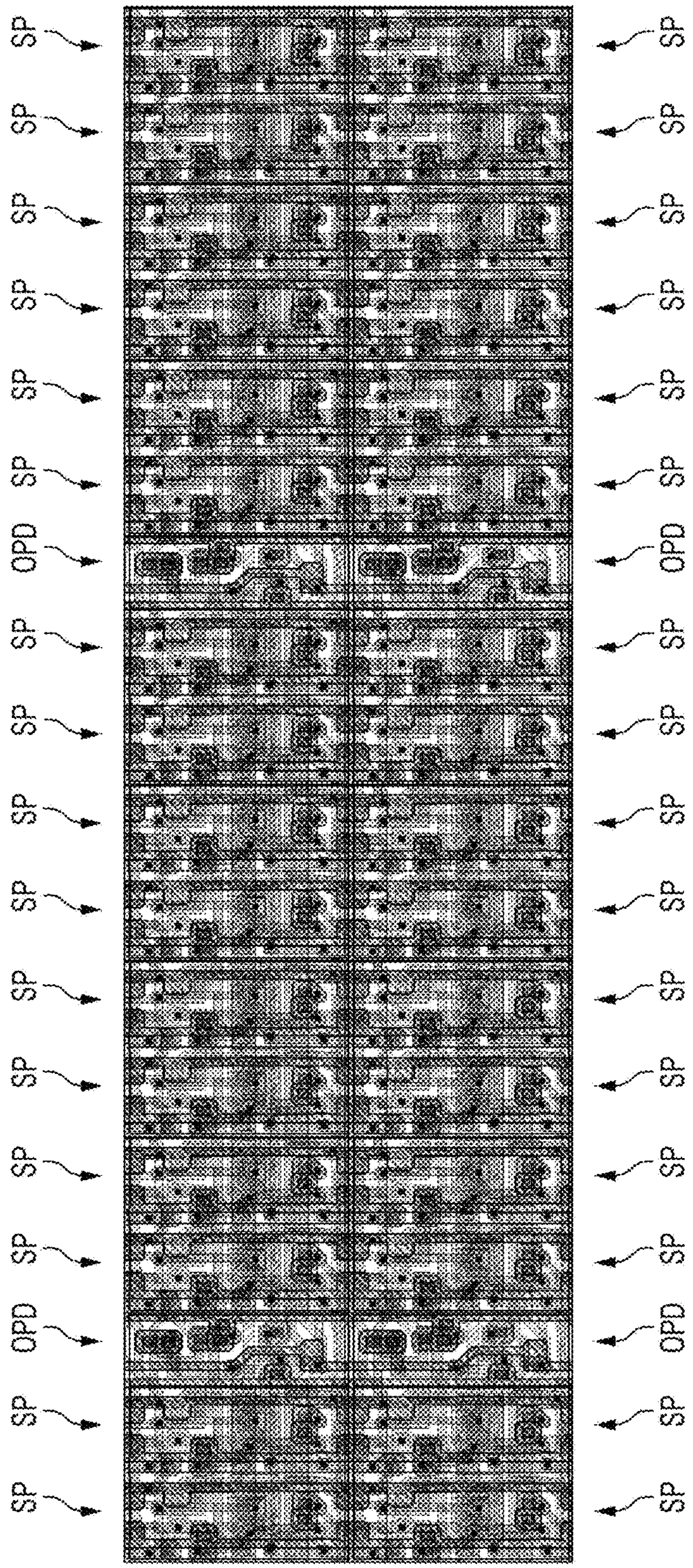
FIG. 18 is a diagram illustrating still another example of the arrangement of a pixel circuit and a sensor circuit in a display device according to some embodiments.

FIG. 15 is a diagram illustrating one example of the arrangement of a pixel circuit and a sensor circuit in a display device according to some embodiments. FIG. 16 is a diagram illustrating another example of the arrangement of a pixel circuit and a sensor circuit in a display device according to some embodiments. FIG. 17 is a diagram illustrating still another example of the arrangement of a pixel circuit and a sensor circuit in a display device according to some embodiments. FIG. 18 is a diagram illustrating still another example of the arrangement of a pixel circuit and a sensor circuit in a display device according to some embodiments.

Referring to FIGS. 15 to 18, the display area DA may include the plurality of pixels SP and the plurality of fingerprint sensors OPD. The pixel circuit of the pixel SP and the sensor circuit of the fingerprint sensor OPD may be located in the same layer and share the gate line GL and the power line VL. The light emitting element ED of the pixel SP and the light receiving element PD of the fingerprint sensor OPD may be located in the same layer, and may share the common electrode CAT corresponding to the second electrode of the light emitting element ED and the second electrode of the light receiving element PD.

In FIG. 15, the display device 10 may include the pixel SP and the fingerprint sensor OPD at a ratio of 2:1. In FIG. 16, the display device 10 may include the pixel SP and the fingerprint sensor OPD at a ratio of 4:1. In FIG. 17, the display device 10 may include the pixel SP and the fingerprint sensor OPD at a ratio of 6:1. In FIG. 18, the display device 10 may include the pixel SP and the fingerprint sensor OPD at a ratio of 8:1. When the display devices 10 of FIGS. 15 to 18 include the display area DA of the same size, as the proportion of the pixels SP increases, the proportion of the fingerprint sensors OPD may decrease in the display area DA. For example, the display device 10 of FIG. 18 may include a relatively large number of pixels to maximize display resolution. For another example, the display device 10 of FIG. 15 may include a relatively large number of fingerprint sensors OPD to improve sensitivity.

The description of the above-described embodiments is merely illustrative, and those skilled in the art will understand that various modifications and equivalent other embodiments are possible therefrom. Therefore, the true scope of protection of the invention should be determined by the appended claims and their equivalents, and all differences within the equivalent scope of what is stated in the claims should be interpreted as being included in the scope of protection determined by the claims and their equivalents.

What is claimed is:

1. A fingerprint sensor comprising:

a gate line on a substrate and configured to supply a gate signal;

a reset voltage line configured to supply a reset voltage;

an initialization voltage line configured to supply an initialization voltage;

a read-out line on the gate line and configured to supply a sensing signal;

a light receiving element on the read-out line;

a first sensor transistor configured to supply a sensing current based on a voltage of a sensor node, which is a first electrode of the light receiving element;

a second sensor transistor comprising a second-first sensor transistor and a second-second sensor transistor connected in series between the reset voltage line and a gate electrode of the first sensor transistor; and a third sensor transistor comprising a third-first sensor transistor and a third-second sensor transistor connected in series between the read-out line and a first electrode of the first sensor transistor, wherein each of the first sensor transistor, the second sensor transistor, and the third sensor transistor comprises a silicon-based semiconductor region, and wherein a gate electrode of the third-first sensor transistor and a gate electrode of the third-second sensor transistor are integral and electrically connected to the gate line.

2. The fingerprint sensor of claim 1, wherein the silicon-based semiconductor region of each of the first to third sensor transistors are in a same layer and contain low temperature polycrystalline silicon.

3. The fingerprint sensor of claim 1, wherein the second sensor transistor is configured to supply the reset voltage to the sensor node based on a reset signal.

4. The fingerprint sensor of claim 1, wherein the third sensor transistor is configured to electrically connect the read-out line to the first electrode of the first sensor transistor based on the gate signal.

5. A fingerprint sensor comprising:

a gate line on a substrate and configured to supply a gate signal;

a reset voltage line configured to supply a reset voltage;

an initialization voltage line configured to supply an initialization voltage;

a read-out line on the gate line and configured to supply a sensing signal;

a light receiving element on the read-out line;

a first sensor transistor configured to supply a sensing current based on a voltage of a sensor node, which is a first electrode of the light receiving element;

a second sensor transistor comprising a second-first sensor transistor and a second-second sensor transistor connected in series between the reset voltage line and a gate electrode of the first sensor transistor;

a third sensor transistor comprising a third-first sensor transistor and a third-second sensor transistor connected in series between the read-out line and a first electrode of the first sensor transistor;

an active layer on the substrate and comprising semiconductor regions of the first to third sensor transistors;

a first gate layer on the active layer;

a second gate layer on the first gate layer;

a first source metal layer on the second gate layer;

a second source metal layer on the first source metal layer; and a third source metal layer on the second source metal layer and comprising the read-out line.

6. The fingerprint sensor of claim 5, further comprising a first sensor connection electrode in the first source metal layer and configured to electrically connect the gate electrode of the first sensor transistor to a second electrode of the second-second sensor transistor.

7. The fingerprint sensor of claim 6, further comprising:

a first sensor anode connection electrode in the second source metal layer and connected to the first sensor connection electrode; and a second sensor anode connection electrode in the third source metal layer and configured to electrically connect the first sensor anode connection electrode to a sensor electrode of the light receiving element.

8. The fingerprint sensor of claim 5, further comprising:

a reset signal line on the second gate layer and configured to supply a reset signal; and a second sensor connection electrode in the first source metal layer and configured to electrically connect the reset signal line to a gate electrode of each of the second-first sensor transistor and the second-second sensor transistor.

9. The fingerprint sensor of claim 5, further comprising:

a third sensor connection electrode in the first source metal layer and connected to a first electrode of the third-first sensor transistor; and a read-out electrode in the second source metal layer and configured to electrically connect the third sensor connection electrode to the read-out line.

10. The fingerprint sensor of claim 5, wherein the reset voltage line comprises a horizontal reset voltage line in the second source metal layer and extending in a first direction, and a vertical reset voltage line in the third source metal layer and extending in parallel with the read-out line.

11. The fingerprint sensor of claim 10, further comprising a fourth sensor connection electrode in the first source metal layer and configured to electrically connect a first electrode of the second-first sensor transistor to the horizontal reset voltage line.

12. A display device comprising:

a pixel comprising a pixel circuit on a substrate and a light emitting element connected to the pixel circuit;

a fingerprint sensor comprising a sensor circuit in a same layer as the pixel circuit and a light receiving element connected to the sensor circuit and in a same layer as the light emitting element;

a gate line configured to supply a gate signal to the pixel circuit and the sensor circuit;

a reset voltage line configured to supply a reset voltage to the sensor circuit;

a first initialization voltage line configured to supply a first initialization voltage to the pixel circuit;

a second initialization voltage line configured to supply a second initialization voltage to the pixel circuit and the sensor circuit; and a read-out line configured to receive a sensing signal from the sensor circuit, wherein the sensor circuit comprises:

a first sensor transistor configured to control a sensing current based on a voltage of a sensor node, which is a first electrode of the light receiving element;

a second sensor transistor comprising a second-first sensor transistor and a second-second sensor transistor connected in series between the reset voltage line and a gate electrode of the first sensor transistor; and a third sensor transistor comprising a third-first sensor transistor and a third-second sensor transistor connected in series between the read-out line and a first electrode of the first sensor transistor.

13. The display device of claim 12, wherein the semiconductor region of each of the first to third sensor transistors are in a same layer and contain low temperature polycrystalline silicon.

14. The display device of claim 12, further comprising:

an active layer on the substrate and comprising semiconductor regions of the first to third sensor transistors;

a first gate layer on the active layer;

a second gate layer on the first gate layer;

a first source metal layer on the second gate layer;

a second source metal layer on the first source metal layer; and a third source metal layer on the second source metal layer and comprising the read-out line.

15. The display device of claim 14, further comprising:

a display driver configured to drive the pixel and the fingerprint sensor;

a data line connected to the display driver, extending in a first direction, and configured to supply a data voltage to the pixel;

a first bridge line connected to the display driver and extending in the first direction; and a second bridge line electrically connecting the first bridge line to the data line or the read-out line.

16. The display device of claim 15, wherein the first bridge line is in the third source metal layer and extends in parallel with the read-out line, and the second bridge line is in the second source metal layer and extends in a second direction intersecting the first direction.

17. A display device comprising:

a pixel comprising a pixel circuit on a substrate and a light emitting element connected to the pixel circuit;

a fingerprint sensor comprising a sensor circuit in a same layer as the pixel circuit and a light receiving element connected to the sensor circuit and in a same layer as the light emitting element; and a read-out line configured to supply a sensing signal received from the sensor circuit, wherein the pixel circuit comprises:

a first transistor configured to control a driving current flowing through the light emitting element;

a second transistor configured to supply a data voltage to a first electrode of the first transistor;

a third transistor configured to electrically connect a second electrode of the first transistor to a gate electrode of the first transistor;

a fourth transistor configured to discharge the gate electrode of the first transistor to a first initialization voltage;

a fifth transistor configured to supply a driving voltage to the first electrode of the first transistor;

a sixth transistor configured to electrically connect the second electrode of the first transistor to a first electrode of the light emitting element;

a seventh transistor configured to discharge the first electrode of the light emitting element to a second initialization voltage; and an eighth transistor configured to supply a bias voltage to the first electrode of the first transistor, and wherein the sensor circuit comprises:

a first sensor transistor configured to control a sensing current based on a voltage of a sensor node, which is a first electrode of the light receiving element;

a second sensor transistor configured to supply a reset voltage to the sensor node, which is a gate electrode of the first sensor transistor; and a third sensor transistor configured to electrically connect the read-out line to a first electrode of the first sensor transistor, wherein semiconductor regions of the first to eighth transistors of the pixel circuit and semiconductor regions of the first to third sensor transistors of the sensor circuit are in a same layer and contain low temperature polycrystalline silicon.

18. The display device of claim 17, wherein the third transistor comprises a third-first transistor and a third-second transistor connected in series between the gate electrode of the first transistor and the second electrode of the first transistor, and the fourth transistor comprises a fourth-first transistor and a fourth-second transistor connected in series between the gate electrode of the first transistor and a first initialization voltage line supplying the first initialization voltage.

19. The display device of claim 18, wherein the second sensor transistor comprises a second-first sensor transistor and a second-second sensor transistor connected in series between a reset voltage line configured to supply the reset voltage and the sensor node, and the third sensor transistor comprises a third-first sensor transistor and a third-second sensor transistor connected in series between the read-out line and the first electrode of the first sensor transistor.

20. The display device of claim 17, further comprising:

a display driver configured to drive the pixel and the fingerprint sensor;

a data line connected to the display driver, extending in a first direction, and configured to supply a data voltage to the pixel;

a first bridge line connected to the display driver and extending in the first direction; and a second bridge line electrically connecting the first bridge line to the data line or the read-out line.

* * * * *